(12) United States Patent
Heman et al.

(10) Patent No.: US 10,853,346 B2
(45) Date of Patent: Dec. 1, 2020

(54) HIGH-PERFORMANCE DATABASE ENGINE IMPLEMENTING A POSITIONAL DELTA TREE UPDATE SYSTEM

(75) Inventors: Sandor ABC Heman, Amsterdam (NL); Peter A. Boncz, Amsterdam (NL); Marcin Zukowski, Amsterdam (NL); Nicolaas J. Nes, Amsterdam (NL)

(73) Assignee: ACTIAN NETHERLANDS B.V., Amsterdam (NL)

( * ) Notice: Subject to any disclaimer, the term of this patent is extended or adjusted under 35 U.S.C. 154(b) by 811 days.

(21) Appl. No.: 13/417,205

(22) Filed: Mar. 10, 2012

(65) Prior Publication Data

US 2013/0179473 A1   Jul. 11, 2013

Related U.S. Application Data

(62) Division of application No. 12/719,825, filed on Mar. 8, 2010.

(60) Provisional application No. 61/209,833, filed on Mar. 11, 2009, provisional application No. 61/209,820, filed on Mar. 11, 2009, provisional application No. 61/209,796, filed on Mar. 11, 2009.

(51) Int. Cl.
*G06F 16/23* (2019.01)
*G06F 16/22* (2019.01)

(52) U.S. Cl.
CPC ............ *G06F 16/23* (2019.01); *G06F 16/221* (2019.01); *G06F 16/2246* (2019.01)

(58) Field of Classification Search
CPC ..................................................... G06F 16/23
USPC ........................................................ 707/703
See application file for complete search history.

(56) References Cited

U.S. PATENT DOCUMENTS

| | | | |
|---|---|---|---|
| 590,855 | A | 9/1897 | Phelps, Jr. |
| 5,680,557 | A | 10/1997 | Karamchetty |
| 5,920,855 | A | 7/1999 | Aggarwal et al. |
| 5,953,714 | A | 9/1999 | Abdullah |
| 6,292,186 | B1 | 9/2001 | Lehman et al. |
| 6,336,124 | B1 | 1/2002 | Alam et al. |
| 6,343,275 | B1 | 1/2002 | Wong |

(Continued)

FOREIGN PATENT DOCUMENTS

| | | |
|---|---|---|
| EP | 855656 | 7/1998 |
| EP | 754325 | 12/2000 |

OTHER PUBLICATIONS

A Critique of ANSI SQL Isolation Levels. By H. Bernenson, et al. In Proc. SIGMOND, 1995.

(Continued)

*Primary Examiner* — Syling Yen
(74) *Attorney, Agent, or Firm* — Arent Fox LLP

(57) ABSTRACT

A computer system hosting a column-store database engine is responsive to database requests for the update and retrieval of data from within a stable data table and providing for the storage of database tuples within a column-store organized database structure. A positional delta tree data structure is implemented in the memory space of the database engine and is operatively coupled in an update data transfer path between a database engine interface and the stable data table. The positional delta tree data structure includes a differential data storage layer operative to store differential update data values in positionally defined relative reference to database tuples stored by the stable data table.

3 Claims, 7 Drawing Sheets

(56) References Cited

U.S. PATENT DOCUMENTS

| | | |
|---|---|---|
| 6,463,582 B1 | 10/2002 | Lethin et al. |
| 6,546,388 B1 | 4/2003 | Edlund et al. |
| 7,089,362 B2 | 8/2006 | Creta et al. |
| 7,404,182 B1 | 7/2008 | Garthwaite et al. |
| 7,448,048 B1 | 11/2008 | Nesamoney et al. |
| 7,685,580 B1 | 3/2010 | Detlefs et al. |
| 7,730,079 B2 | 6/2010 | Meijer et al. |
| 7,783,681 B1 | 8/2010 | Delsart |
| 7,849,444 B2 | 12/2010 | Melamed et al. |
| 8,001,021 B1 | 8/2011 | Quinn et al. |
| 8,095,738 B2 | 1/2012 | Benhase et al. |
| 8,150,850 B2 | 4/2012 | Hermstadt |
| 8,200,527 B1 | 6/2012 | Thompson et al. |
| 8,260,803 B2 | 9/2012 | Hsu et al. |
| 8,271,965 B2 | 9/2012 | Wang |
| 8,364,519 B1 | 1/2013 | Basu et al. |
| 8,386,845 B1 | 2/2013 | Gharpure et al. |
| 8,417,789 B1 | 4/2013 | Gopalan et al. |
| 8,423,981 B2 | 4/2013 | Hudson et al. |
| 8,606,994 B2 | 12/2013 | Ledford |
| 8,626,725 B2 | 1/2014 | Netz et al. |
| 8,767,957 B1 | 7/2014 | Bagchi et al. |
| 8,825,959 B1 | 9/2014 | Switakowki et al. |
| 9,110,946 B2 | 8/2015 | Chen et al. |
| 9,171,041 B1 | 10/2015 | Narayanan et al. |
| 2002/0083049 A1 | 6/2002 | Forster et al. |
| 2002/0165848 A1 | 11/2002 | Rautenbach et al. |
| 2003/0005134 A1 | 1/2003 | Martin et al. |
| 2003/0120654 A1 | 6/2003 | Edlund et al. |
| 2003/0220931 A1 | 11/2003 | Sexton et al. |
| 2005/0084152 A1 | 4/2005 | McPeake et al. |
| 2005/0167917 A1 | 8/2005 | MacIver et al. |
| 2005/0209988 A1 | 9/2005 | Cunningham et al. |
| 2005/0216421 A1 | 9/2005 | Barry et al. |
| 2005/0222996 A1 | 10/2005 | Yalamanchi |
| 2006/0167917 A1 | 7/2006 | Solomon |
| 2006/0200741 A1 | 9/2006 | DeMesa et al. |
| 2006/0212244 A1 | 9/2006 | Levine et al. |
| 2006/0224542 A1 | 10/2006 | Yalamanchi |
| 2006/0293934 A1 | 12/2006 | Tsyganskiy et al. |
| 2007/0067573 A1 | 3/2007 | Bruening et al. |
| 2007/0220027 A1* | 9/2007 | Richey ................ G06Q 10/06 |
| 2007/0240136 A1 | 10/2007 | Garyali et al. |
| 2008/0059492 A1* | 3/2008 | Tarin ........................ 707/100 |
| 2008/0066145 A1 | 3/2008 | Molen et al. |
| 2008/0120469 A1 | 5/2008 | Kornegay et al. |
| 2008/0183958 A1* | 7/2008 | Cheriton ............ G06F 12/0223 |
| | | 711/108 |
| 2008/0235181 A1 | 9/2008 | Faunce |
| 2008/0243969 A1 | 10/2008 | Wintergerst et al. |
| 2008/0244471 A1 | 10/2008 | Killian et al. |
| 2009/0007116 A1 | 1/2009 | Duffy et al. |
| 2009/0094236 A1* | 4/2009 | Renkes ................. G06F 16/275 |
| 2009/0249446 A1 | 10/2009 | Jenkins et al. |
| 2009/0254572 A1 | 10/2009 | Redlich et al. |
| 2009/0300631 A1 | 12/2009 | Karlapalem et al. |
| 2010/0114915 A1 | 5/2010 | Gorton, Jr. |
| 2010/0235335 A1 | 9/2010 | Heman et al. |
| 2010/0250497 A1 | 9/2010 | Redlich et al. |
| 2010/0268773 A1 | 10/2010 | Hunt et al. |
| 2011/0078243 A1 | 3/2011 | Carpenter et al. |
| 2011/0093500 A1 | 4/2011 | Meyer et al. |
| 2011/0208822 A1 | 8/2011 | Rathod |
| 2011/0225232 A1 | 9/2011 | Casalaina et al. |
| 2011/0270711 A1 | 11/2011 | Kusterer |
| 2012/0130986 A1 | 5/2012 | Abdellatif et al. |
| 2013/0173669 A1 | 7/2013 | Tang et al. |
| 2013/0179395 A1 | 7/2013 | Heman et al. |

OTHER PUBLICATIONS

Monet: A Next-Generation DBMS Kernel for Query-Intensive Applications. By P. Boncz. Ph.D. Thesis, Universiteit van Amsterdam, May 2002.

Monet DB/X100: Hyper-Pipelining Query Execution. By P. Boncz, et al. In Proc. CIDR, 2005.

Serializable Isolation for Snapshot Databases. By M.J. Cahil, et al. In Proc. SIGMOD, 2008.

Update Conscious Bitmap Indices. By G. Canahuate, et al.. In Proc. SSDBM 2007.

Improving Index Performance through Prefetching. By S. Chen, P.B. Gibbons, et al. In Proc. SIGMOND, 2001.

Adjoined Dimension Column Clustering to Improve Data Warehouse Query Performance. By X. Chen, et al. In Proc. ICDE, 2008.

A Decomposition Storage Model. By A. Copeland, et al. In Proc. SIGMOND, 1985.

Sorting and Indexing with Partitioned B-Tress. By G. Graefe. In Proc. CIDR, 2003.

Efficient Columnar Storage in B-Trees. By G. Graefe. SIGMOD Record, 36(1), 2007.

Fast Loads and Fast Queries. By G. Graefe. In DaWaK, 2009.

The Transaction Concept: Virtues and Limitations. By J. Gray. In Proc. VLDB, pp. 144-154, 1981.

Incremental Organization for Data Recording and Warehousing. By H.V. Jagadish, et al. In Proc. VLDB, 1997.

Small Materialized Aggregates: A Light Weight Index Structure for Data Warehousing. By G. Moerkotte. In Proc. VLDB, 1998.

Aries: A Transaction Recovery Method Supporting Fine-Granularity Locking and Partial Rollbacks Using Write-Ahead Logging. By C. Mohan, et al. TODS, 17(1), 1992.

The Log-Structured Merge-Tree. By P. O'Neil, E. Cheng, D. Gawlick, et al. Acta Informatica, 33(4), 1996.

Multi-Dimensional Clustering: A New Data Layout Scheme in db2. By S. Padmanabhan, et al. In Proc. SIGMOD, 2003.

Block Oriented Processing of Relational Database Operations in Modern Computer Architectures. By S. Padmanabhan, et al. In Proc. ICDE, 2001.

A Case for Fractured Mirrors. By R. Ramamurthy, D.J. DeWitt, et al. The VLDB Journal, 12(2):89-101, 2003.

Differential Files: Their Application to the Maintenance of Large Databases. By D. Severance, et al. ACM Trans. Database Syst., 1(3), 1976.

Data Warehouse Technology by InfoBright. By D. Slezak, et al. In Proc. SIGMOD, 2009.

C-Store: A Column-Oriented DBMS. By M. Stonebracker et al. In Proc. VLDB, 2005.

Counted B-Trees. By S. Tatham. In www.chiark.gyeenend.org.uk/sgtatham/algorithms/cbtree/html, 2001.

Luszczak, A. "Simple Solutions for Compressed Execution in Vectorized Database System", MSc thesis, University of Warsaw, 2011 (70 pgs.).

Moerkotte, G. "Small Materialized Aggregates: A Light Weight Index Structure for Data Warehousing . . . ", University Mannheim, Germany In Proc. VLDB, 1998 (12 pgs.).

Hankins, R. et al "Data Morphing: An Adaptive, Cache-Conscious Storage Technique" Proceedings of the 29th VLDB Conference, Berlin, Germany, 2003, pp. 1-12 (12 pgs.).

Anastassia Ailamaki, et al., Weaving Relations for Cache Performance, Proceedings of the 27th VLDB Conference, Rome, Italy, 2001, pp. 1-12.

Martin Grund, et al., HYRISE—A Main Memory Hybrid Storage Engine, VLDB '10, Sep. 1317, 2010, Singapore, Copyright 2010 VLDB Endowment, ACM 000-0-00000-000-0/00/00, pp. 1-12 (12 pgs.).

The Vertica® Analytic Database Technical Overview White Paper, A DBMS Architecture Optimized for Next-Generation Data Warehousing, Mar. 2010, pp. 1-13 (13 pgs.).

Vertica Database Data Sheet, Mar. 2010, pp. 1-3.

Lang, C. et al. Increasing buffer-locality for multiple relational table scans through grouping and throttling. In ICDE, Istanbul, Turkey, 2007 (10 pgs.).

Zukowski, M. et al. "Dynamic Bandwidth Sharing in a DBMS." VLDB 2007, Vienna, Austria, Sep. 2007 (12 pgs.).

Alicja Luszczak, Simple Solutions for Compressed Execution in Vectorized Database System. MSc thesis, University of Warsaw, 2011 (11 pgs.).

(56) References Cited

OTHER PUBLICATIONS

Abadi, D. et al. "Integrating compression and execution in column-oriented database systems." In *Proceedings of the 2006 ACM SIGMOD international conference on Management of data*, 2006, 671-682 (12 pgs.).
Alfons Kemper, Thomas Neumann, HyPer: A hybrid OLTP&OLAP main memory database system based on virtual memory snapshots, ICDE, 2011 (12 pgs.).
Krikellas, K. et al., "Generating code for holistic query evaluation, ICDE", pp. 613-624, 2010 (12 pgs.).
J. Rao, H. Pirahesh, C. Mohan, G. M. Lohman, Compiled Query Execution Engine using JVM, ICDE, 2006 (12 pgs.).
M. Zukowski. Balancing Vectorized Query Execution with Bandwidth-Optimized Storage. Ph.D. Thesis, Universiteit van Amsterdam, Sep. 2009 (245 pgs.).
Raducanu, B. et al. Micro Adaptivity in a Vectorized Database System, Master Thesis in Parallel and Distributed Computer Systems, Universitatea Politehnica Bucuresti / Vrije Universiteit van Amsterdam, Aug. 2012 (62 pages).
A Light Weight Index Structure for Data Warehousing. By G. Moerkotte. In Proc. VLDB, 1998.
J. Sompolski, "Just-in-time Compilation in Vectorized Query Execution", Master thesis in Computer Science, University of Warsaw and VU University Amsterdam, Aug. 2011 (94 pgs.).
Sompolski et al., "Vectorization vs. Compilation in Query Execution", Proceedings of the Seventh International Workshop on Data Management on New Hardware, Jun. 13, 2011, Athens, Greece, pp. 33-40 (8 pgs.).

\* cited by examiner

HIGH-PERFORMANCE DATABASE ENGINE IMPLEMENTING A POSITIONAL DELTA TREE UPDATE SYSTEM

This application is a divisional application of application Ser. No. 12/719,825, filed Mar. 8, 2010, which claims the benefit of U.S. Provisional Application Nos. 61/209,833, 61/209,820, and 61/209,796, all filed Mar. 11, 2009.

LIMITED COPYRIGHT WAIVER

A portion of the disclosure of this patent document contains material to which the claim of copyright protection is made. The copyright owner has no objection to the facsimile reproduction by any parson of the patent document or the patent disclosure as it appears in the US Patent and Trademark Office file or records, but reserves all other rights whatsoever.

BACKGROUND OF THE INVENTION

Field of the Invention

The present invention is generally related to database storage management systems and, in particular, to a column-store database storage system utilizing a positional delta tree subsystem in high-performance support of database access requests.

Description of the Related Art

Column-oriented data base systems, commonly referred to as column-stores have recently regained commercial and research momentum, particularly for use in performance intensive read-mostly application areas, such as data warehousing. The primary benefit of column-stores, particularly relative to the more conventional row-oriented database systems, is that a column-store requires significantly fewer disk input/output (I/O) disk operations to satisfy read requests. In applications where the predominate operation is database reads particularly over large data sets, a database system optimized for read-only operation can achieve significantly higher performance levels while minimizing expensive disk I/O operations. Conventionally, column-stores are recognized as read-only, or in practical implementation, read-mostly optimized databases. Data warehousing, data-mining, and other similar application areas are recognized as characteristically involving a high proportion of read to update requests over very large data sets.

The primary characteristic of a column-store is use of a decomposed storage model (DSM) where data is persisted in column-oriented storage blocks, rather than the more conventional row-oriented, or natural storage model (NSM), storage blocks. Since read requests are implemented as scans over a read query identified set of columns, typically a small subset of the columns present in a table, substantially fewer column block reads and corresponding disk I/O operations are required to fulfill the read request by a column-store as compared with a row-store.

More formally, a column-store is defined as having one or more tables where each TABLE <$col_1, \ldots, col_n$> is a collection of related columns of equal length, each column $col_i$ is a sequence of values, and a tuple is a single row within TABLE. Thus, tuples consist of values aligned in columns and can be retrieved from the set of table columns using a single row-id, or tuple, index value. Although the standard database relational model is order-oblivious, column-stores strategically manage the physical tuple storage in order to inexpensively reconstruct tuples from columns without requiring expensive value-based joins. The physical storage structures used in a column-store are designed to allow fast lookup and join by position using either conventional B-tree storage with the tuple position as key typically in a highly compressed format or dense block-wise storage with a separate sparse index with the start row-id of each block.

An update performed on a column-store table is an insert, delete, or modify operation. A TABLE.insert(t, i) adds a full tuple t to the table at row-id i, resulting in an incrementing of the row-ids of existing tuples at row-ids i . . . N by one. A TABLE.delete(i) deletes the full tuple at row-id i from the table, similarly resulting in a decrementing of the row-ids of existing tuples at row-ids i+ . . . 1 N by one. A TABLE.modify(i, j, v) changes attribute j of an existing tuple at row-id id i to value v. Transactions are defined as consisting of one or more, or BATCH, of updates.

In conventional implementation, a variety of design and operational techniques are employed to further enhance the read-oriented performance of column-store databases. One technique is the application of physical sort key (SK) ordering on column-store tables. The consistent physical storage ordering of the column-store tuples allows a defined sort ordering to be imposed based on the tuple value of one or more columns. Tuples are thus stored in a sort order according to sequence of sort attributes S representing the chosen sort key for the table. This physical ordering by sort key functions to restrict scans to a fraction of the disk blocks in cases where the scan query contains range or equality predicates dependent on any prefix of the sort key attributes. In practical terms, explicitly ordered tuple storage is the columnar equivalent of index-organized tables (clustered indices) often used in row-stores. Other conventionally employed techniques include data compression, clustering, and replication.

Although the read-optimized performance of column-stores represents a substantial advantage, the performance penalty imposed on update operations due to the columnar storage organization has generally been sufficient to dissuade most use of column-stores. In naive implementations, each tuple update performed on a column-store table having C columns will require at least C disk block writes, as opposed to just one by most conventional row-store databases. Because the column blocks are typically scattered within the disk store, potentially multiple disk seek and I/O operations are required for each column block access. The cumulative disk utilization of update operations also creates the potential for blocking reads, thereby directly impacting the primary operation of the column-store.

Recent improvements to conventional column-store database designs address the update performance issue by implementing a split read-store/write-store architecture. Updates complete directly against a relatively small, separate write-store, typically maintained in system memory, without notable impact on read performance. The content of the write-store is strategically scheduled for merger into the disk-based read-store as ongoing use of the column-store permits.

The complexity and overhead of read operations are, however, substantially increased by the necessity to perform on-the-fly merger of tuples as read separately from the read and write-stores. The merger is required to return data values accurately representing the current composite state of the data store. A known conventional approach to managing the read/update merge operation involves organizing the update data in the write-store as a log structured merge tree (LSMT). Typically, an LSMT is implemented as a simple stack of tree data structures that differ in size by a fixed ratio, with each tree structure storing an insert or delete delta relative to the data stored by the underlying tree structures. At least the topmost, smallest, tree structure is typically cached in system memory. Lower tree levels that cannot be effectively maintained in system memory are migrated and potentially consolidated to a disk-resident write-store in a layout optimized for sequential access. To improve performance of the merge of data read from the read and write-stores, the delta information maintained in the LSMT is generally kept in some sort order corresponding to the underlying column-store table.

While the LSMT represents the current conventionally preferred write-store structure for column-stores, the read performance penalty associated with use of the LSMT remains a substantial impediment to the practical adoption and use of column-stores. Notably, the differential nature of the LSMT is beneficial in that it may limit the depth of tree structures that must be considered in satisfying each on-the-fly read/update data merge. The storage of delta information as value-based differential values, however, forces an extended, if not full key column scan of an underlying disk-based read-store in order to perform each read/update data merge. That is, to apply a differential update to the data stream retrieved from the disk-based read-store, the exact tuple each update applies to must be identified by comparing the update values, as determined by sort order key, to those of the tuples in the corresponding table as stored in the disk-based read-store. Even where the tuples read from both the read and write-stores are sorted, discretely identifying an updated tuple requires reading all of the columns that make up the table sort key, even where many if not most of the key columns are not specified as part of a particular query. The existence of many sort key columns in a table is not uncommon in analytical scenarios. Consequently, the read scan access of the disk-based read-store can and typically will span substantially more columns than may be specified by the read query. This required expansive read-scan and related data merge directly imposes substantial time and resource expensive disk I/O to retrieve sort key attribute values as well as significant CPU overhead due to the complexity of arbitrary data type, multicolumn merge operations, resulting in degradation of all column-store related operations.

SUMMARY OF THE INVENTION

Thus, a general purpose of the present invention is to provide an efficient column store database system of practical application through the use of a managed read and write-store positional update data structure to support high throughput read performance in the presence of updates and to allow updates to be performed with minimal impact on read performance.

This is achieved in the present invention by providing a column-store database computer system responsive to database requests for the update and retrieval of data from within a stable data table and providing for the storage of database tuples within a column-store organized database structure. A positional delta tree data structure is implemented in the memory space of the computer system and is operatively coupled in an update data transfer path between a database engine interface and the stable data table. The positional delta tree data structure includes a differential data storage structure operative to store differential update data values in positionally defined relative reference to database tuples stored by the stable data table.

An advantage of the present invention is that the read performance of a column store database is maintained while enabling fast update operations. Database updates nominally execute against a positional delta tree data structure. Read operations resolve as a merger of data from the underlying column store and the positional delta tree data structure. The positional delta tree structure is specifically designed to minimize the computational and I/O resource requirements for performing on-the-fly data merges.

Another advantage of the present invention is that the composed structure of the positional delta tree enables the effective pre-computation of read data merge locations, thereby minimizing the I/O operations required to resolve and merge data from the positional delta tree for each database read operation and the corresponding CPU load. Read operation merges using the positional delta tree structure are essentially insensitive to the presence and composition of database table sort keys.

A further advantage of the present invention is that the performance impact of updates accumulated in a positional delta tree data structure is a substantially linear function of the depth of the positional delta tree data structure. Update operations impose a substantially fixed overhead to pre-compute the position of the update and store the results in the positional delta tree data structure. Read operations incur a scan overhead required to locate any applicable updated data stored in the positional delta tree data structure.

Still another advantage of the present invention is that the positional delta tree data structure can reduce the requirements for and impacts of database locks on database transactions. Further, the positional delta tree data structure directly supports update isolation in transactions and an efficient conflict check mechanism operative on transaction commit.

Yet another advantage of the present invention is that the positional delta tree is organized as a functionally layered system, enabling efficient use and management in the implementation of database engine operations, including queries, updates, merges, and checkpoints. A substantial number of updates can be accumulated without significantly affecting query performance. Through systematic management of the positional delta tree data structures, updates captured initially in an in-memory write store positional delta tree layer are subsequently transferred into an in-memory read-store positional delta tree layer, and then to the underlying column store data tables as stored in a persistent read-store. The transfers preferably occur in response to merge and checkpoint events, and complete with little significant impact on ongoing query performance. The layered, consistently managed positional delta tree data structures thus makes the database system generally insensitive to whether updates are performed as individual updates or batched as bulk updates.

Still a further advantage of the present invention is that the positional delta tree data structure is specifically designed to be memory space efficient. While portions may be copied to a persistent data store, preferably the entire structure resides in and operates from within a combination of the CPU cache memory and main memory store of a database computer system. By maintaining the positional delta tree data structure in memory, on-the-fly merger of update and read data is achieved without requiring additional persistent data store I/O operations. By allowing specific portions of the positional delta tree data structure to be loaded and maintained in CPU cache memory, the number of main memory store accesses is reduced, resulting in a significant reduction of overall processing overhead and improved performance particularly in completing on-the-fly merger computations.

DETAILED DESCRIPTION OF THE INVENTION

Figure 1:
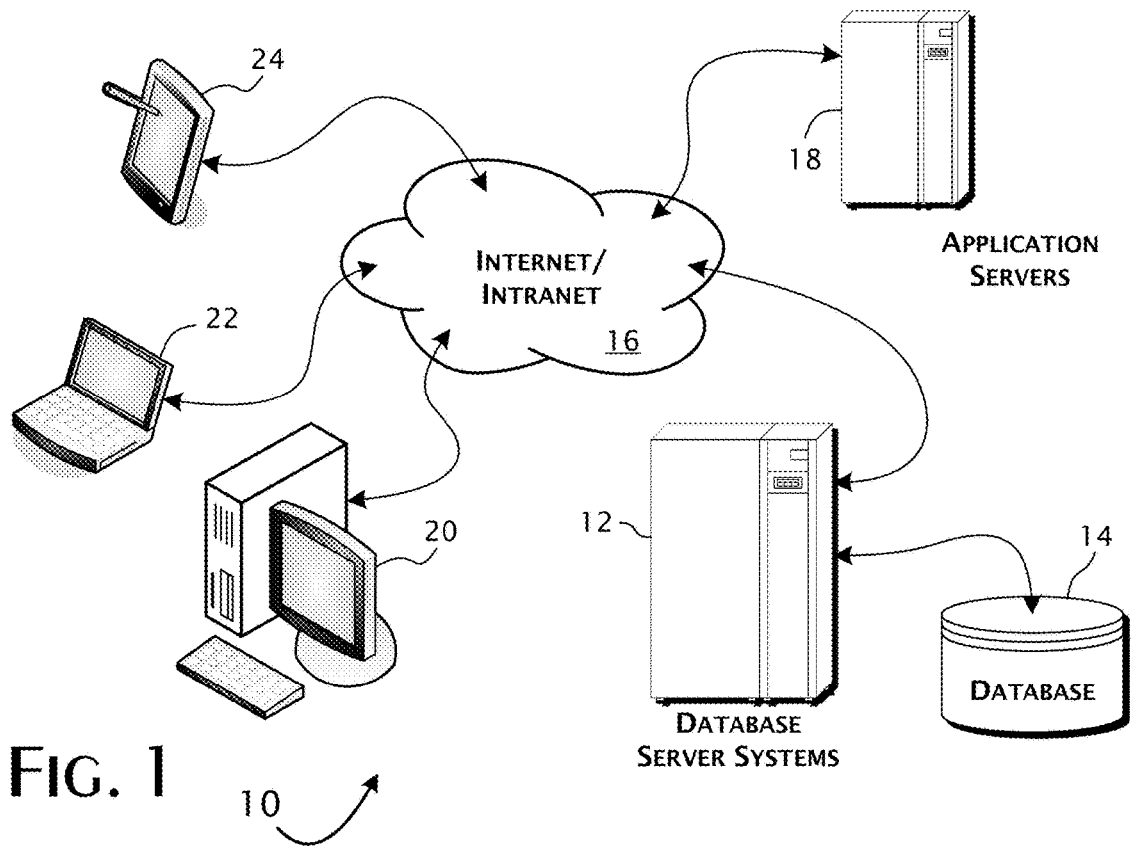
FIG. 1 is a system diagram illustrating the operating environment of a preferred embodiment of the present invention.

The present invention generally provides a column-store database system and methods of operation appropriate for application areas typically referred to as online transaction processing (OLTP). Column-store database systems implementing the present invention have particular utility in online analytical processing (OLAP) systems that require high performance of complex analytical and ad-hoc queries and in other application areas where accesses of the underlying database tables are read-mostly including, for example, data warehousing, mining, reporting, and business process management and similar areas. Read-mostly database access is characterized by a substantial domination of database table read accesses to update, or write, accesses. In the following detailed description of the invention like reference numerals are used to designate like parts depicted in one ore more of the figures.

A typical application environment 10 of the present invention is generally illustrated in FIG. 1. One or more database server systems 12 host, directly or indirectly, a database 14. Access requests are typically received through some combination of an Internet and intranet 16 from one or more application servers 18, executing OLTP applications. The specific operations of the OLTP applications are typically directed by or execute in support of client applications executed on client computers 20 of various description including mobile computers 22 and communications devices 24.

Figure 2:
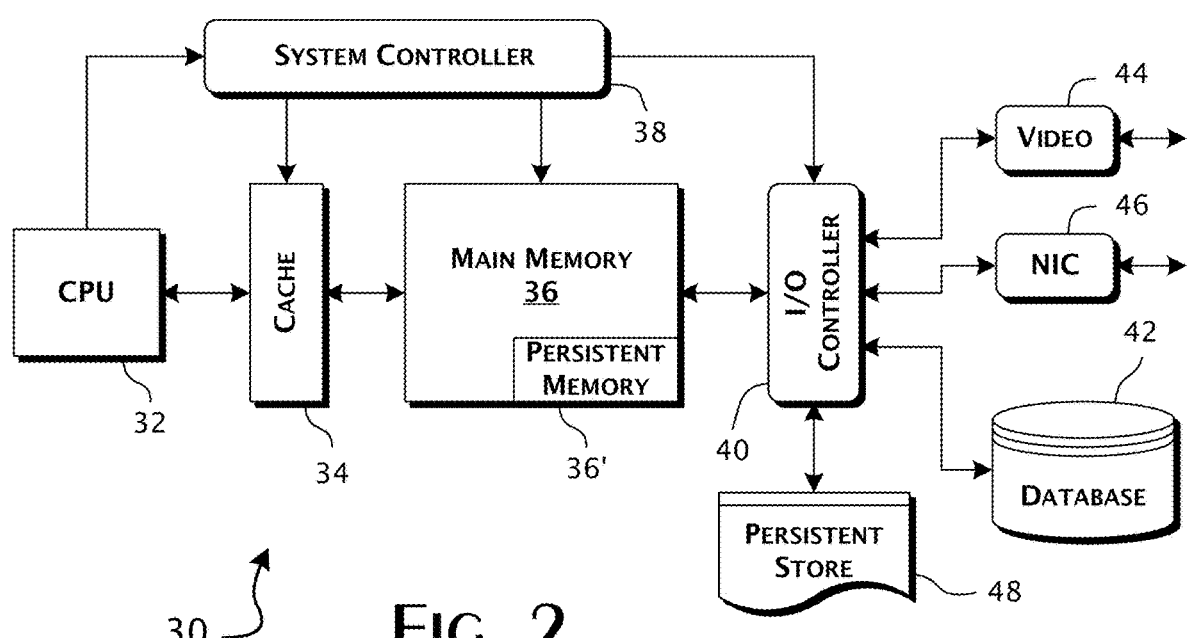
FIG. 2 is a simplified block diagram of a computer system utilized in the implementation of the present invention.

As generally shown in FIG. 2, the architecture 30 of a database server system 12 appropriate for use in conjunction with the present invention may be largely conventional. Preferably, the central processing unit (CPU) subsystem 32, implemented for example as a multi-core, multiprocessor subsystem, includes some combination of in-core and close coupled cache subsystem 34 connected to a main memory store 36. In typical embodiments, the cache subsystem 34 will range from 2 to 32 megabytes per core with typically additional, larger cache layers shared among the cores within the CPU subsystem 32. Main memory 36 will be substantially larger. A portion 36' of the main memory store 36 may be implemented to be persistent, utilizing Flash memory or a conventional backup battery solution. A system controller 38, as generally illustrated, manages data transfers between the central processing subsystem 32, cache 34, and main memory 36 subsystems through one or more input/output (I/O) controllers 40 that connect, directly or indirectly, to a physical database 42, and I/O devices, including typically a video controller 44 and network interface controller 46. A high-access rate persistent store 48, utilizing a high-performance magnetic or Flash emulation disk, may also be provided.

Figure 3:
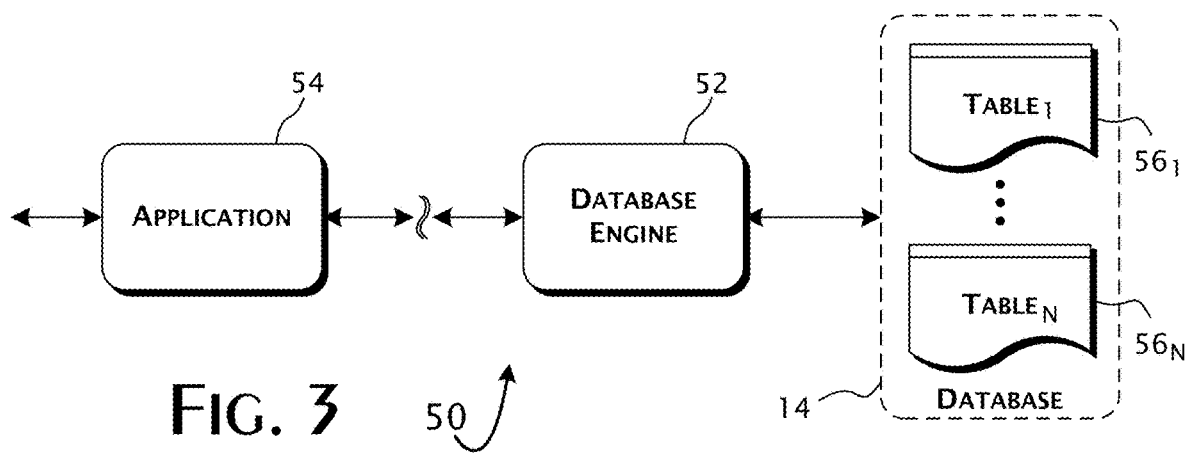
FIG. 3 provides a block diagram illustrating a preferred tiered implementation of the present invention.

Referring to FIG. 3, within a preferred execution environment 50, the present invention is preferably implemented in or as part of a database engine 52. Database read and update requests are received from one or more applications 54 and satisfied by access to a database 14 containing one or more data tables $56_{1-N}$. The applications 54 may be executed local or remote with respect to the database engine 52. The database 14 may be implemented as a physical storage device 42 connected directly to a database server system 12 that executes the database engine 52 or remotely through storage area network (SAN) or other distributed data storage system.

Figure 4:
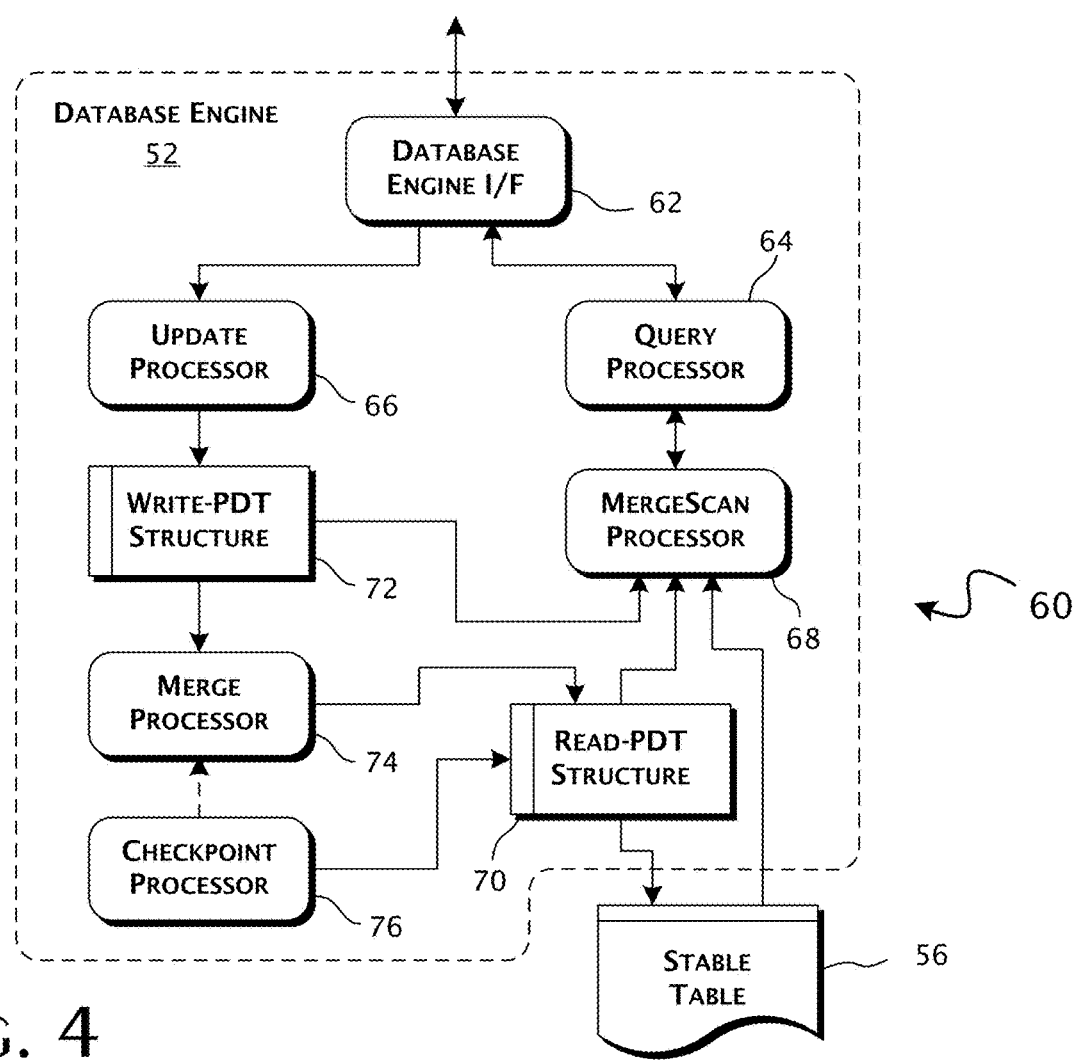
FIG. 4 provides a detailed structural diagram of a preferred implementation of a database engine in a preferred embodiment of the present invention.

A preferred implementation 60 of a database engine 52 is shown in FIG. 4. A database engine interface 62 provides, in preferred implementations, a defined communications port for the submission of database access requests and receipt of database responses, including as appropriate, data records. Read requests are preferably presented as query specifications, typically as structured query language (SQL) statements. A query processor 64 preferably implements an SQL interpreter responsible for implementing the corresponding operations, typically resulting in some access of or operation on the data tables 56. For purposes of the present invention, the significant SQL operations include data table reads and updates. A data read operation generally involves an SQL defined scan query of one or more tables $56_{1-N}$ to retrieve corresponding tuples. A data update operation generally involves an SQL defined tuple insert, tuple value modification, or tuple delete against a table 56.

As implemented in a preferred embodiment of the present invention, read operations are handled through the query processor 64 and update operations are handled through an update processor 66. In ongoing operation, read operations are executed by the query processor 64 against the database 14 including at least one table 56. For clarity of discussion, operations will be described as occurring against the single table 56. Per-table data structures, as identified where significant, enable operation against the full set of database 14 tables 56$_{1-N}$. A merge scan processor 68 operates to perform dynamic, or functionally on-the-fly, merges of relevant differential data from a read-positional delta tree (PDT) data structure 70 and data tuples read from the underlying stable table 56. In accordance with the present invention, the read-positional delta tree data structure 70 is specifically designed and maintained such that no additional I/O accesses to the underlying stable table 56 are required in order to determine when and where to apply the update data contained within the read-positional delta tree data structure 70. This and other positional delta tree data structures implemented within the scope of the database engine 52 thus enable the dynamic operation of the merge scan processor 68. A read-positional delta tree 70 is preferably provided for each table 56 accessible by the merge scan processor 68. The appropriate read-positional delta tree 70 is preferably accessed by the merge scan processor 68 based on a table identifier correspondence. Part or all of a stable table image 56 may be buffered in the main memory store 36 and managed in a conventional manner.

Update operations, at least initially, are executed to completion by the update processor 66 directly against a write-positional delta tree data structure 72. A write-positional delta tree 72 is preferably provided for each table 56 accessible by the update processor 66. The appropriate write-positional delta tree 72 is preferably accessed by the update processor 66 based on a table identifier correspondence. The merge scan processor 68, in performing dynamic merges of differential data, will also access the corresponding write-positional delta tree 72. Data returned by the merge scan process 68 is thus the combined merge of read and write differential data applied to data tuples read from the underlying stable table 56.

At intervals, the differential data stored by the write-positional delta tree 72 is preferably merged, by operation of a merge processor 74, into the corresponding read-positional delta tree 70 and the write-positional delta tree 72 is cleared. The PDT merge interval is preferably defined as occurring whenever the size of a write-positional delta tree 72 exceeds a pre-defined threshold value. Other circumstances, such as the aggregate size of the write-positional delta trees 72 exceeding a predefined threshold value, may also be used to trigger the merge processor 74.

A checkpoint processor 76 operates, at intervals defined by checkpoint events, to merge the differential data stored by the read-positional delta tree 70 into the stable table 56, resulting, logically, in a new persistent stable table 56. Checkpoint events are typically defined to occur in relation to the state and ongoing operation of the database engine 52. In the preferred embodiments of the present invention, the checkpoint processor 76 will trigger the merge processor 74 to first flush the differential data held by the write-positional delta trees 72 into the read-positional delta trees 70 before merging the read-positional delta trees 70 to the stable tables 56. The read-positional delta trees 70 are then cleared.

In the currently preferred embodiments of the present invention, the PDT data structure is implemented substantially as a counted B+ tree, containing the differential updates representative of the update operations performed by the update processor 66. In accordance with the present invention, the PDT data structure is designed to store differential updates in a manner that enables the merge scan processor 68, in response to the query processor 64, to quickly access and efficiently merge the updates with tuples retrieved from the tables 56. This high performance merger operation is facilitated by the pre-computation of the merger positions by the update processor 66 as the differential updates are added initially to the write-PDT 72 and as subsequently transferred to the read-PDT 70.

Because the differential updates stored by the PDT data structure 70, 72 are correlated to an ordered table, represented tuple positions are volatile as each insertion and deletion operation is applied to the PDT data structure 70, 72. Each pre-computation performed for the addition of a new differential update to the PDT data structure 70, 72 must take into account the prior updates applied to the PDT data structure 70, 72. In accordance with the present invention, a mapping is maintained between two monotonically increasing numbers associated with tuples in the underlying table 56. The first mapping numbers are referred to as Stable IDs (SIDs) and correspond to the consecutively ascending tuple positions defined within the stable table 56. The SIDs, as stored in the PDT data structure 70, 72 as references to positions within the table 56, need not be necessarily consecutive or unique. The second mapping numbers are referred to as current Row IDs (RIDs) and correspond to the SIDs subject to effective merge application of prior in time differential updates. SID values are initially stored in the write-PDT data structure 72 and the RID values are computed as new differential updates are applied to the PDT data structure 70, 72.

The pre-computation of merger positions permits a merge operator within the merge scan processor 68 to directly apply the update differences to the tuple stream otherwise retrieved from the tables 56. The merge operator does not require any additional accesses to the data stored in the tables 56, such as to evaluate sort key order, in order to apply the differential updates. As a result, use of the PDT data structure 70, 72 requires substantially fewer I/O operations and imposes a substantially lower CPU burden relative to conventional value-based merging, particularly where the accessed table sort key is compound or includes nonnumerical attributes as part of the key. Consequently, the database engine 54, particularly through use of the PDT data structure 70, 72, enables quick and efficient column-store update operations without any significant compromise of read performance. In addition, the progressive capture of discrete differential updates allows the write-PDT data structure 72 to be an efficient basis for transaction management.

While an instance per table 56 is preferred, use of the read-positional delta trees 70 is optional. All read-PDT data structures 70 may be omitted where the merge processor 74 and checkpoint processor 76 function is combined. The differential updates accumulated by the write-PDT data structure 72 are then persisted to the tables 56. In addition, instances of both the read and write-PDT data structures 70, 72 may be omitted for individual tables 56 under circumstances where a table 56 is, for example, read-only. The preferred implementation of the read and write-PDT data structures 70, 72 is, however, designed to be space efficient. The read and write-PDT data structures 70, 72 are, in typical use, sufficiently compact to be maintained fully in random-access memory. In particular, as will be discussed below, the read and write-PDT data structures 70, 72 are designed to allow significant portions of the structures to fit within the CPU cache 34 during significant periods of use. If main memory store 36 usage becomes an issue, portions of the read-PDT data structures 70 may be strategically migrated to a fast access magnetic or Flash-based disk store. Where database resilience between checkpoints is a matter of concern, the read-PDT data structures 70 may be progressively migrated to persistent random-access memory, implemented as Flash or battery-backed memory, provided either as a resident section of the main memory store 36 or as an external disk emulation store. The preferred embodiments of the present invention implement both read and write-PDT data structures 70, 72 for updatable tables 56.

Figure 5:
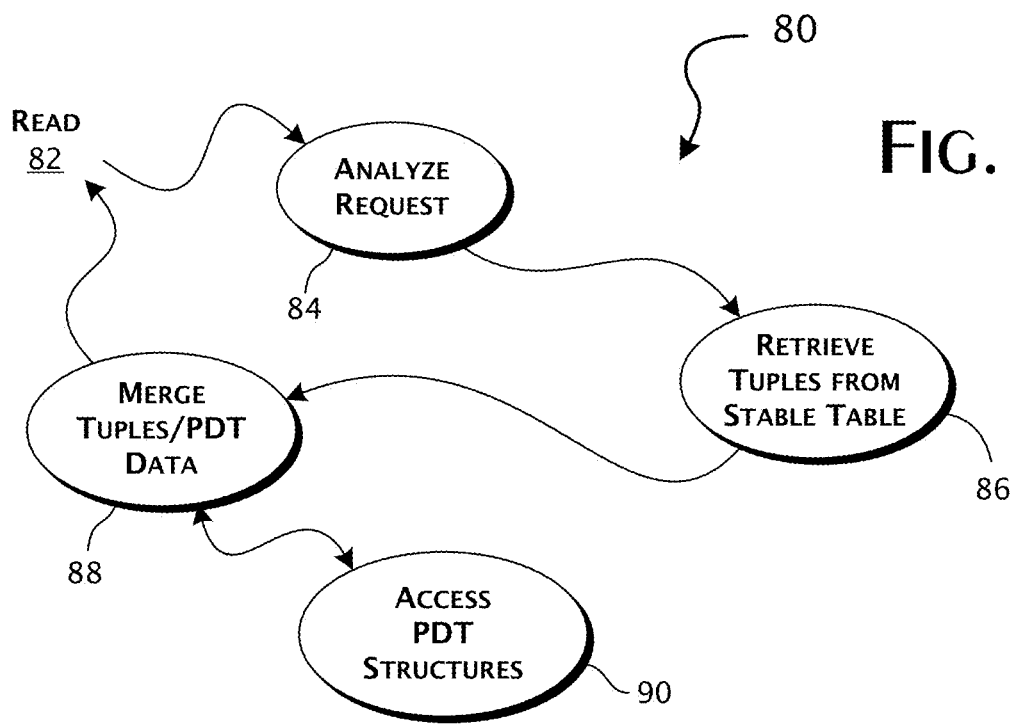
FIG. 5 provides a flow diagram illustrating a data query operation as implemented in a preferred embodiment of the present invention.

A read operation 80, as implemented in a preferred database engine 52 embodiment of the present invention, is shown in FIG. 5. On receipt of a read request 82 by the database engine interface 62, the request is routed to the query processor 64 for analysis 84. The query specification of the read request is utilized to retrieve 86 corresponding tuples from the stable table 56. As the query scan proceeds 88 to return a tuple data stream to the query processor 64, a scan cursor maintained internal by the merge scan processor 68 is evaluated 90 against the read and write-PDT data structure 70, 72 update positions. As appropriate, differential update data from the read and write-PDT data structures 70, 72 are merged into the tuple data stream at the scan cursor. The resulting tuples are returned by the query processor 64 through the database engine interface 62.

Figure 6:
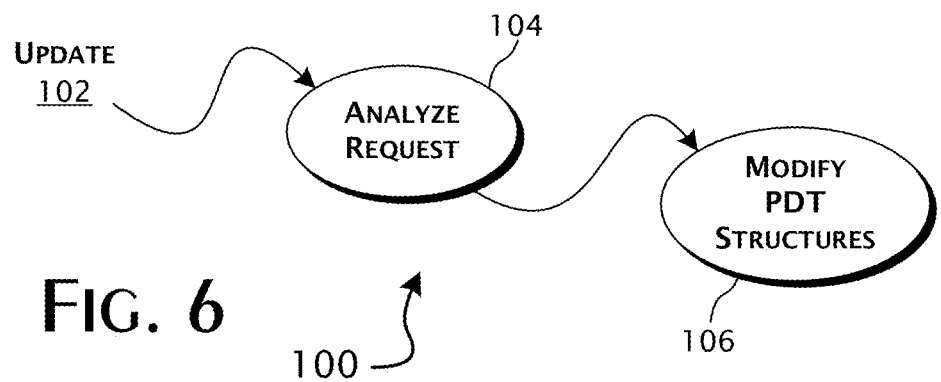
FIG. 6 provides a flow diagram illustrating a data update operation as implemented in a preferred embodiment of the present invention.

An update operation 100, as implemented in a preferred database engine 52 embodiment of the present invention, is shown in FIG. 6. On receipt of an update request 102 by the database engine interface 62, the request is routed to the update processor 66 for analysis 104, including pre-computation of the SID and RID corresponding update positions. Formally, the SID for a tuple $\tau$ is denoted SID($\tau$), and defined to be the position of a tuple $\tau$ within the present stable table 56, defined as TABLE$_0$, starting the tuple numbering at 0. The RID($\tau$) for a tuple $\tau$ is defined as the position of $\tau$ at time t; thus SID($\tau$)=RID($\tau$)$^0_0$. The value of SID($\tau$) never changes throughout the lifetime of the tuple $\tau$ with respect to a TABLE$_0$. A newly inserted tuple $\tau$ is assigned a SID($\tau$) where the value of $\tau$ is larger than the SID of the preceding stable tuples (if any) and equal to the first following stable tuple (if any), according to table sort order. A RID is also assigned to a stable tuple $\tau$ that was deleted, becoming a ghost tuple, with a value of one more than the RID of the preceding non-ghost tuple (if any) and equal to the first following non-ghost tuple (if any). For purposes of discussion if a tuple T reference is clear in context, SID($\tau$) is abbreviated to SID, and similarly for RID. If the time t is clear in context (e.g., the start time of the current transaction), RID$_t$ is abbreviated to RID.

In general, considering the relative stacking of the read and write PDT data structures 70, 72 and thus having the state of the table 56 represented at multiple points in time, the RID difference $\Delta$ between two time-points is defined as:

$$\Delta_{t_2}^{t_1}(\tau) = \text{RID}(\tau)_{t_2} - \text{RID}(\tau)_{t_1}$$

In the common case where only the read-PDT data structure 70 contains a relevant differential update relative to a particular stable table 56, denoted TABLE$_0$, Equation 2 reduces to RID minus SID:

$$\Delta_t(\tau) = \text{RID}(\tau)_t - \text{SID}(\tau)$$

Where the sort-key (SK) based Table time-wise difference is defined as:

$$\text{MINUS}_{t_2}^{t_1} = \{\tau \in \text{Table}_{t_1} : \forall \gamma \in \text{Table}_{t_2} . \tau \cdot \text{SK} = \gamma \cdot \text{SK}\}$$

then the RID difference $\Delta$ can be computed as the number of inserts minus the number of deletes before tuple $\tau$:

$$\Delta_{t_2}^{t_1}(\tau) = |\{\gamma \in \text{MINUS}_{t_1}^{t_2} : \text{RID}(\gamma)_{t_2} \leq \text{RID}|(\tau)_{t_2}\}| - |\{\gamma \in \text{MINUS}_{t_2}^{t_1} : \text{SID}(\gamma) < \text{SID}(\tau)\}|$$

The differential update, including pre-computed positional values, is then stored 106 in a corresponding write-PDT data structure 72. As will be discussed below, additional update-related positional delta tree data structures are created and managed in a layered relation to support various functions including, for example, snapshot isolation and transaction management. In general, these additional PDT data structures efficiently localize update operations so as to minimally impact ongoing query operations and to support multiple, potentially overlapping update transactions. Since these updates are captured in PDT data structures, essentially the same data transfer operations can be utilized to, when validated, transfer differential updates to a write-PDT data structure 72 and, subsequently, to a read-PDT data structure 70. For purposes of further discussion, where clear from context, the shared structural design of these additional, read, and write-PDT data structures will be referred to generically as either a DIFF differential update structure or PDT data structure 70'.

In the presently preferred embodiments, a PDT data structure 70', represented as DIFF(t$_1$, t$_2$), is defined as containing updates from a time range [t$_1$, t$_2$):

$$\text{Table}_{t_2} = \text{Table}_{t_1} \cdot \text{Merge}(\text{DIFF}_{t_2}^{t_1})$$

Given a layered stack of DIFF structures, where the top most DIFF structure contains the most recent in time updates, the current image of a relational table is represented by result of a bottom-up, progressive merger of the DIFF structures in the stack beginning with a stable table 56 TABLE$_0$. The relations between adjacent DIFF structures can be characterized as aligned if the table state they are based on is equal:

$$\text{Aligned}(\text{DIFF}_{t_B}^{t_A}, \text{DIFF}_{t_D}^{t_C}) \Leftrightarrow t_A = t_C$$

Adjacent DIFF structures are characterized as consecutive if the time where the first difference ends equals the time the second difference starts:

$$\text{Consecutive}(\text{DIFF}_{t_B}^{t_A}, \text{DIFF}_{t_D}^{t_C}) \Leftrightarrow t_B = t_C$$

Two differential structures are overlapping if their time intervals overlap:

$$\text{Overlapping}(\text{DIFF}_{t_B}^{t_A}, \text{DIFF}_{t_D}^{t_C}) \Leftrightarrow t_A < t_D \leq t_B \text{ and } t_C < t_B \leq t_D \quad \text{Eq. 8}$$

A relative time t value, rather than absolute time, identifies the moment a transaction started and is preferably represented by a monotonically increasing logical number, such as a Log Sequence Number (LSN). Where a checkpoint event result in the creation of a new stable table, TABLE$_0$, the time number t is relative to the start of the last successfully completed checkpoint. In context, the current DIFF$^0_t$, denoted using the shortened notation DIFF.

Figure 7:
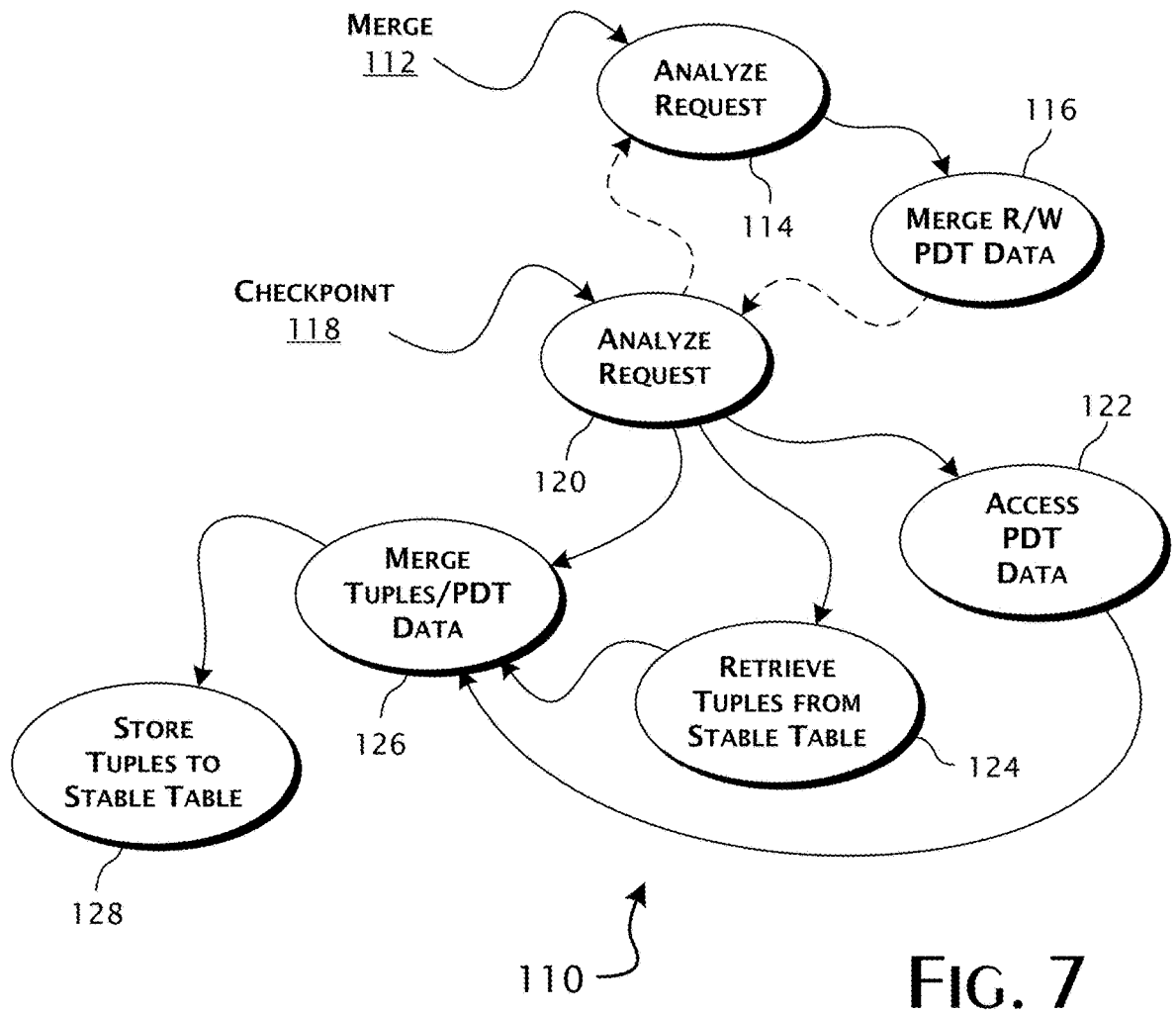
FIG. 7 provides a flow diagram illustrating a data merge operation as implemented in a preferred embodiment of the present invention.

As generally shown in FIG. 7, merge and checkpoint operations 110, as implemented in a preferred database engine 52 embodiment of the present invention, provide for the background propagation of differential update data initially from the write-PDT 72 to the read-PDT 70 and, eventually, to the stable table 56. A merge request 112 is typically generated autonomously by the database engine 52 in response to any of a number of different triggers and subject to a number of different strategies. Preferably these triggers and strategies may include, for example, when the size or complexity of the write-PDT data structure 72 exceeds an empirical or performance-determined threshold and when read activity drops below an empirical or performance-determined threshold. In execution, a merge request 112 proceeds by analyzing 114 the write-PDT data structures 72 to ensure, for example, that no transactions are open on a particular write-PDT data structure 72. For a free write- PDT data structure 72, the differential updates are then merged 116 into the corresponding read-PDT data structure 70 and the write-PDT data structure 72 is cleared. Where a particular write-PDT data structure 72 is not free due, for example, to the presence of an open transaction, committed updates in the write-PDT data structure 72 may be merged 116 into the corresponding read-PDT data structure 70 and the merged updates pruned from the write-PDT data structure 72.

In the presently preferred embodiments, differential updates held by read-PDT data structures 70 are progressively persisted to the stable table 56 in response to checkpoint events. Checkpoint events are typically time-based. Checkpoints are also typically forced by command as received by the database engine interface 62 and when a database engine 52 shutdown signal is received. In execution, processing of a checkpoint request 118 preferably proceeds by first initiating a merge operation 112. The resulting read-PDT data structures 70 are then analyzed 120 to determine the scope of the differential update data 122 and formulate an update scan of the corresponding stable table 56. The update scan is then executed 124. In general, tuples are progressively read 124, merged with corresponding differential updates 126, and written back 128 to the stable table 56. Where possible, in-place updates are performed by writing 128 data values directly to the tuples as stored in the stable table 56. As persisted, the corresponding differential updates are pruned from the read-PDT data structures 70.

Figure 8:
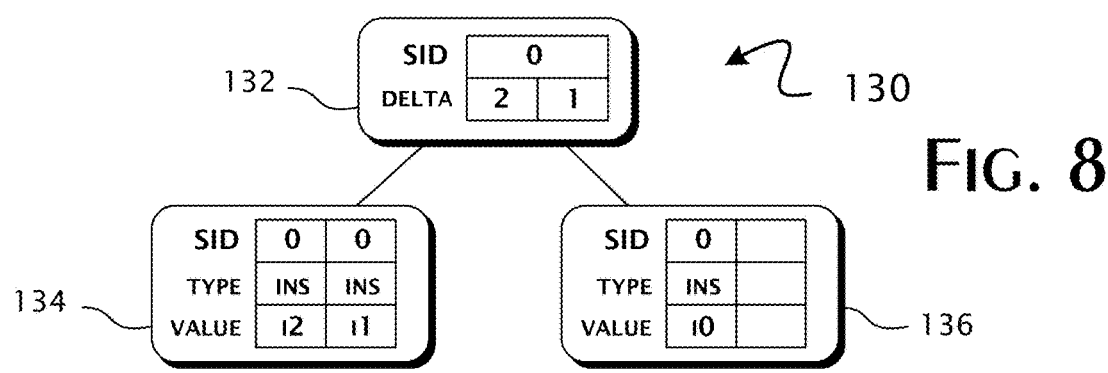
FIG. 8 is a data structure representation illustrating a positional delta tree structure maintaining a data update record in accordance with a preferred embodiment of the present invention.

FIGS. 8-0 illustrate a use of a PDT data structure 70' in support of a stable table 56 consistent with use in a preferred embodiment of the present invention. For purposes of example, the stable table 56 stores a data warehouse inventory, with sort key (store, product), generally as shown in Table 1.

TABLE 1

| SID | Store | Product | New | Quantity | RID |
|---|---|---|---|---|---|
| 0 | London | chair | N | 30 | 0 |
| 1 | London | stool | N | 10 | 1 |
| 2 | London | table | N | 20 | 2 |
| 3 | Paris | rug | N | 1 | 3 |
| 4 | Paris | stool | N | 5 | 4 |

The exemplary table is populated with tuples, as shown, by a prior bulk load and establishes a stable table 56, TABLE$_0$, persistently stored in the database 14. The RIDs and SIDs are shown associated with the stable table 56 for clarity of example; RIDs and SIDs need not be and, in the presently preferred embodiments, are not explicitly stored as part of the stable table 56 or in the database 14. The initial RIDs and SIDs are identical.

The following sequence of insert statements are captured to the PDT data structure 70' as update operations.

INSERT INTO inventory VALUES ('Berlin', 'table', 'Y', '10');
INSERT INTO inventory VALUES ('Berlin', 'cloth', 'Y', '5');
INSERT INTO inventory VALUES ('Berlin', 'chair', 'Y', '20');

Because the inventory table is kept sorted on (store, product), the tuples are inserted at SID 0, creating a B+ tree like structure as generally shown in FIG. 8. A PDT data structure 70' tree fan-out of two is used for presentation purposes. In presently preferred embodiments, a fan-out of 8 or 16 is used. The fan-out is preferably chosen appropriate to allow one or more layers of the PDT data structure 70' to be stored within a few lines of the CPU cache 34. Specifically, portions of both the read and write-PDT data structures 70, 72 and the additional, relatively transient PDT data structures may be read into and simultaneously used from the CPU cache 34. As shown in FIG. 8, the tree nodes store SIDs as separator keys relative to their immediate leaf-nodes, and delta values that define the RID, SID mapping. The separator SID in the inner nodes, such as node 132, represents the minimum SID of the right subtree. The left-to-right leaf order of node entries in the PDT data structure 70' determines the entry order in a logical table TABLE$_1$, shown as Table 2, representing the state of the stable table 56, TABLE$_0$, after performance of the three inserts.

TABLE 2

| SID | Store | Product | New | Quantity | RID |
|---|---|---|---|---|---|
| 0 | Berlin | chair | Y | 20 | 0 |
| 0 | Berlin | cloth | Y | 5 | 1 |
| 0 | Berlin | table | Y | 10 | 2 |
| 0 | London | chair | N | 30 | 3 |
| 1 | London | stool | N | 10 | 4 |
| 2 | London | table | N | 20 | 5 |
| 3 | Paris | rug | N | 1 | 6 |
| 4 | Paris | stool | N | 5 | 7 |

Leaf nodes of the PDT data structure 70', such as nodes 134, 136, store the SID identifying where the corresponding update applies, a type identifier (preferably INS for inserts, DEL for deletes, and an attribute table identifier, such as QTY for Quantity, for value modifications) and a reference to a value record containing the new tuple values. Because of the different nature of the information needed to be stored for the various updates types (delete, insert, modify), these value records are stored in separate insert, delete, and attribute value tables, preferably as part of a PDT data structure 70'. That is, a set of instances are associated with each separate instance of a PDT data structure 70'. Thus, a PDT data structure 70' is implemented as:

$$\text{DIFF} = (\text{PDT}, \text{VALS}) \quad \text{Eq. 9}$$

with value tables defined as:

$$\text{VALS} = (\text{ins} < \text{col}_1, \ldots, \text{col}_N >,$$

$$\text{del} < \text{SK} >,$$

$$\text{col}_1 < \text{col}_1 >, \ldots, \text{col}_N < \text{col}_N >) \quad \text{Eq. 10}$$

Each PDT data structure 70' thus has an associated value space for the storage of corresponding types of tuple information: an insert value table stores new tuples, a delete value table that stores deleted tuples identified by sort key (SK), and an attribute value table that stores modified column data values per column. Following the insert operations the insert value table is populated as shown in Table 3.

TABLE 3

| | Insert Values | | | |
|---|---|---|---|---|
| INS | Store | Product | New | Quantity |
| i0 | Berlin | table | Y | 10 |
| i1 | Berlin | cloth | Y | 5 |
| i2 | Berlin | chair | Y | 20 |

Delete and attribute value modification operations are similarly captured into the PDT data structure 70'. Deletions produce a node entry of type DEL and a reference to a delete value table in the value space that contains the sort key values of the deleted stable tuples. By operation of the merge scan processor 68 in performing merge operations, deleted tuples are not returned as part of a read request. Value modifications of type QTY are represented in the modification value table by attribute.

Figure 9:
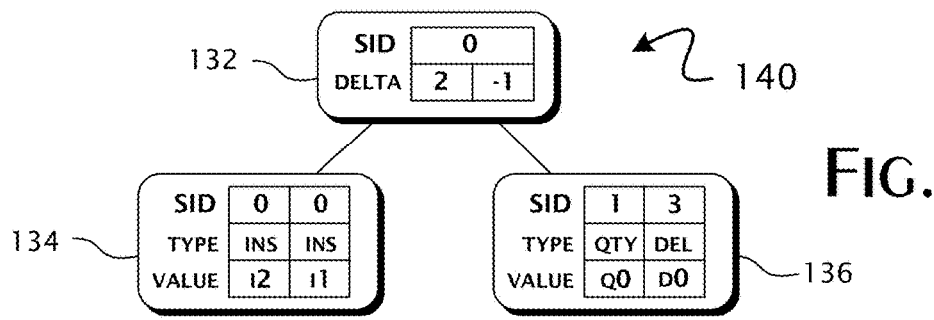
FIG. 9 is a data structure representation illustrating a positional delta tree structure maintaining multiple update records in accordance with a preferred embodiment of the present invention.

FIG. 9 illustrates the state of the PDT data structure 70' after capture of the following statements and the insert, delete and attribute value tables are as shown in Tables 4-6.

UPDATE inventory SET qty=1 WHERE store='Berlin' and prod='cloth';
UPDATE inventory SET qty=9 WHERE store='London' and prod='stool';
DELETE FROM inventory WHERE store='Berlin' and product='table';
DELETE FROM inventory WHERE store='Paris' and product='rug';

TABLE 4

| INS | Insert Values | | | |
|---|---|---|---|---|
| | Store | Product | New | Quantity |
| i0 | | | | |
| i1 | Berlin | cloth | Y | 1 |
| i2 | Berlin | chair | Y | 20 |

TABLE 5

| DEL | Delete Values | |
|---|---|---|
| | Store | Product |
| d0 | Paris | rug |

TABLE 6

| MOD | Modify Values |
|---|---|
| | Quantity |
| q0 | 9 |

The first update statement results in a value modification to the tuple at RID 1, represented as a corresponding modification of the insert value table tuple i1, since the referenced tuple is not present in the stable table 56. In comparison, the second update statement produces a value entry in the attribute value table against the attribute (quantity), thus representing a value update to a tuple present in the stable table. Unmodified attributes are preferably not represented in the attribute value table to minimize value space requirements. Where an attribute modification modifies one or more of the sort key columns of a tuple, the modification is instead preferably handled as a deletion of the existing tuple followed by an insert of the updated tuple.

The first delete statement removes the previously inserted tuple i0 from the insert value table, since the referenced tuple is not present in the stable table. In the presently preferred embodiments, the value space tables are implemented as forward-growing arrays. The deletion of a previously inserted tuple results in an empty insert value record, representing unused space kept on a free-list. Subsequent inserts may re-use this space. The second delete statement results in the creation of a delete value table entry specified by the corresponding sort key. This identifies the existence of a ghost tuple, as the tuple otherwise exists in the underlying stable table. Maintenance of ghost tuples is desirable, since the SIDs of newly inserted tuples are assigned values with respect to the original sort key order of the underlying stable table 56. The deletion of a tuple having prior value modifications represented in the attribute value table would result in the similar removal of the attribute value table entries and creation of the delete value table entry.

The logical state of the stable table 56, effectively TABLE$_2$, is thus as shown in Table 7. The ghost tuple is represented at SID 3.

TABLE 7

| SID | Store | Product | New | Quantity | RID |
|---|---|---|---|---|---|
| 0 | Berlin | chair | Y | 20 | 0 |
| 0 | Berlin | cloth | Y | 1 | 1 |
| 0 | London | chair | N | 30 | 2 |
| 1 | London | stool | N | 9 | 3 |
| 2 | London | table | N | 20 | 4 |
| 3 | Paris | rug | N | 1 | 5 |
| 4 | Paris | stool | N | 5 | 5 |

Figure 10:
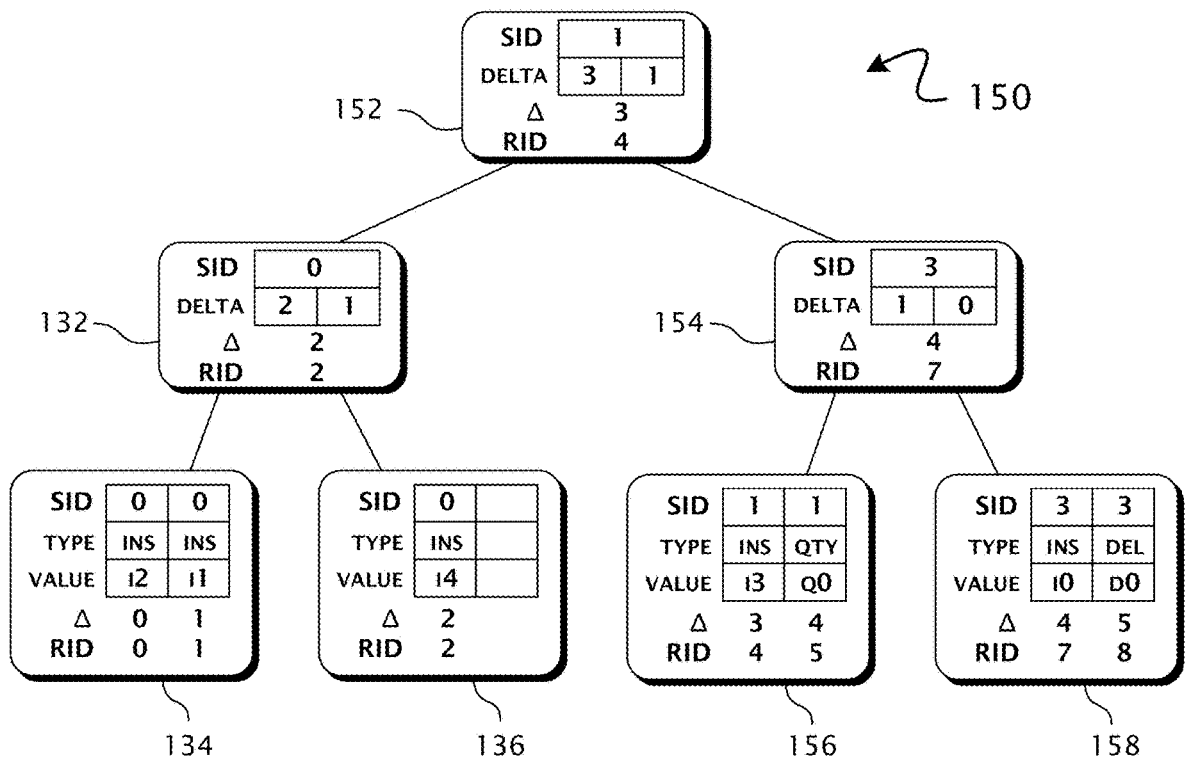
FIG. 10 is a data structure representation illustrating a positional delta tree structure maintaining further update records in accordance with a preferred embodiment of the present invention.

FIG. 10 illustrates the state of the PDT 68 following performance of the following three additional inserts.

INSERT INTO inventory VALUES ('Paris', 'rack', 'Y', '4');
INSERT INTO inventory VALUES ('London', 'rack', 'Y', '4');
INSERT INTO inventory VALUES ('Berlin', 'rack', 'Y', '4');

The logical state of the stable table 56, effectively TABLE$_3$, is thus as shown in Table 8. The ghost tuple is represented at SID 3/RID 8.

TABLE 8

| SID | Store | Product | New | Quantity | RID |
|---|---|---|---|---|---|
| 0 | Berlin | chair | Y | 20 | 0 |
| 0 | Berlin | cloth | Y | 1 | 1 |
| 0 | Berlin | rack | Y | 4 | 2 |
| 0 | London | chair | N | 30 | 3 |
| 1 | London | rack | Y | 4 | 4 |
| 1 | London | stool | N | 9 | 5 |
| 2 | London | table | N | 20 | 6 |
| 3 | Paris | rack | Y | 4 | 7 |
| 3 | Paris | rug | N | 1 | 8 |
| 4 | Paris | stool | N | 5 | 8 |

As shown in FIG. 10, the nodes are annotated to show the progressive RID difference Δ and mapped correspondence to SID. As defined in Eq. 1, the Δ accounts for the number of inserts minus the number of deletes in preceding updates to the PDT data structure 70'. The Δ is thus zero for the leftmost insert. For the inner nodes 132, 152, 154, the annotated value is the separator value, thus corresponding to the lowest RID of the right relative subtree. The PDT data structure 70' maintains the DELTA field in the inner nodes, which is the contribution to Δ of all updates in the child subtrees of the node. As shown in FIG. 9, this value can be negative. The Δ value for the first modification in a leaf node is thus readily obtained by summing the respective DELTA values on a root-to-leaf path. The Δ, and thus RID, for the leaf nodes can be directly computed by counting the inserts and deletes from left-to-right in the leaf. Thus, for the preferred embodiments of the present invention, the Δ and RID values are not explicitly stored in the PDT data structure 70'. Since lookup as well as updates to the PDT data structure 70' only involve the nodes on a root-to-leaf path, the computational cost is a logarithmic function of the PDT data structure 70' size.

In a preferred embodiment of the present invention, the database engine 52 preferably implements a PDT data structure 70', represented in the C programming language, as follows.

```
typedef struct {
    uint64 16:n, 48:v
} upd_t;
#define INS              65535
#define DEL              65534
#define PDT_MAGIC        0xFFFFFFFFFFFF
#define is_leaf(n)       ((n).sid[0] != PDT_MAGIC)
#define type(x)          update[x].n    /* INS, DEL or ...*/
#define col_no(x)        update[x].n    /* column number */
#define value(x)         update[x].v    /* value space offset */
#define F                8
typedef struct {
    uint64    sid[F];
    upd_t     update[F];
} PDT_leaf;
typedef struct {
    uint64    sid[F];
    sint64    delta[F];
    void*     child[F];
} PDT_intern;
```

This preferred implementation minimizes the leaf memory size. A leaf node in this preferred PDT data structure 70' includes a SID, the type field, and a value reference field. The type field is provided with distinct values for INS, DEL, and MOD for each column in the table. The offset reference stored value fits 6 bytes, resulting in a PDT data structure 70' storage consumption per modification of 16 bytes. A fan-out (F) of eight is chosen in combination with a leaf node size of 128 bytes. Thus, leaf nodes can be stored aligned in two lines of a typical CPU cache 34. An anonymous type child pointer is used in the internal node to allow reference to either another internal node or a leaf node. Since internal nodes need only F−1 SIDs, the first SID value of is used as a marker to distinguish internal nodes from leaf nodes. As so structured, a preferred PDT data structure 70' implements a B+ like tree permitting storage of a map between two non-unique monotonically increasing keys, SID and RID.

Operation of the database engine 52 proceeds on the premise that the PDT data structure 70' key (SID, RID) is a unique key of a corresponding table 56. Updates performed against a PDT data structure 70' are thus also ordered on SID and on RID. Therefore, for any PDT data structure 70' and corresponding underlying stable table 56, a chain of N updates with equal SID is always a sequence of N−1 inserts, followed by either another insert, a modification, or a deletion of a tuple relative to the underlying stable table 56. A chain of N updates with equal RID is also always a sequence of N−1 deletions, followed by either another deletion, a modification of the subsequent underlying stable table tuple, or a newly inserted tuple. Consequently, efficient searches over the PDT data structure 70' can be performed for an exact key (SID, RID) match, or by RID or SID. Algorithm 1 provides a pseudo-code representation of a PDT search algorithm as implemented in a preferred embodiment of the present invention.

Algorithm 1

PDT.FindLeafByRid(rid)
PDT.FindLeftLeafByRid(rid)
PDT.FindLeafByRidSid(rid, sid)
PDT.FindLeafBySid(sid)

The implementation below finds the rightmost leaf that updates a given RID. Corresponding variants can be implemented to find the leftmost leaf, or search by SID or (SID, RID).

Pseudo code:

```
node = this
δ = 0
while is_leaf(node) = false do
    for i = 0 to node_count(node) do
        δ = δ + node.delta[i]
        if rid < node.sids[i] + δ then
            δ = δ − node.delta[i]
            break from inner loop
        end_if
    end_for
    node = nodel.child[i]
end_while
return (node, δ)
```

The query processor 64 preferably implements a MergeScan operator that functions to merge a tuple data stream retrieved from an underlying stable table 56 with the differential updates stored by the PDT data structure 70'. A next( ) method is central to the MergeScan operator. Algorithm 2 provides a pseudo-code implementation of a preferred Merge.next( ) method. In combination with the basic function of returning tuples, this method implements a skip counter that efficiently identifies the next position in the tuple stream that needs to be updated from the PDT data structure 70'. When an update position is reached, a corresponding update action is applied, resulting in a current tuple data stream.

Algorithm 2 can and is preferably optimized to use block-oriented pipelined processing of the tuple stream. Since the skip value is typically large, entire blocks of tuples may be passed through unmodified by the next( ) method, thereby reducing copying overhead.

Algorithm 2

Merge.next( )

The Merge operator has as state the variables pos, rid, skip, and DIFF and Scan, respectively, a PDT data structure 70' and an input operator. Its next( ) method returns the next tuple resulting from a merge between Scan and a left-to-right traversal of the leaves of DIFF. The pos, rid values are initialized to 0, leaf to the leftmost leaf of DIFF and skip=leaf.sid[0] (if DIFF is empty, skip=1). Note, the new rid is attached to each returned tuple.

Pseudo code:

```
newrid = rid
rid = rid + 1
while skip > 0 or leaf.type[pos] = DEL do
    tuple = Scan.next( )
    if skip > 0 then
        skip = skip − 1
        return (tuple, newrid)
    end_if
    // delete: do not return the next tuple
    (pos, leaf) = DIFF.NextLeafEntry(pos, leaf)
    skip = leaf.sid[pos] − tuple[sid]
end_while
if leaf.type[pos] = INS then
    tuple = leaf.value[pos]
    (pos, leaf) = DIFF.NextLeafEntry(pos, leaf)
```

```
        else
            tuple = Scan.next( )
            while leaf.sid[pos] ≡ tuple.sid do // MODs same tuple
                col = leaf.col_no[pos]
                tuple[col] = leaf.values[pos][col]
                (pos, leaf) = DIFF.NextLeafEntry(pos, leaf)
            end_while
        end_if
        skip = leaf.sid[pos] – tuple[sid]
        return (tuple, newrid)
```

Adding a modification or deletion update to a PDT data structure 70' requires identification of an unambiguous update target RID. While a ghost record may share a RID with a succeeding tuple, representing the only circumstance where a RID is associated with more than one tuple, a ghost record cannot be the target of a modification or deletion. The modification or deletion update is then made to the end of an update chain that shares the same RID. If the final update of such a chain is represented by an insert or modify value table record in the PDT data structure 70', that record is modified in-place. Pseudo-code implementations of the preferred methods for adding a new modification or deletion update to a PDT data structure 70' are outlined in Algorithms 3 and 4, respectively. Conventional B-tree specific operational details, such as splitting full leaves and jumping from one leaf to its successor, are omitted for clarity. The method AddNodeDeltas(leaf, val), not shown, functions to add a (possibly negative) value val to all DELTA fields of the inner nodes on the path from the root to leaf.

The RID values necessary for the performance of modification and deletion update operations are determined as a function of the update request defining the corresponding modification or deletion update operation. The update request, typically providing an SQL query specification, functionally identifies the tuples that will be modified or deleted. A MergeScan operation defined by the query specification will result in a read scan of the stable table 56 with the PDT data structure 70', resulting in an identification of corresponding RIDs that will be subject to a current modification or deletion update operation.

Algorithm 3
  PDT.AddModify(rid, col_no, new_value)
Finds the rightmost leaf containing updates on a given rid, adding a new modification triplet at index pos, or modify in-place.

```
(leaf, δ) = this.FindLeafByRid(rid)
(pos, δ) = this.SearchLeafForRid(leaf, rid, δ)
while leaf.sid[pos] + δ ≡ rid and leaf.type[pos] ≡ DEL do
    pos = pos + 1
    δ = δ – 1
end_while
if leaf.type[pos + δ ≡ rid then       // In-place update
    if leaf.type[pos] ≡ INS then
        offset = this.ModifyInsertSpace(pos, col_no, new_value)
    else
        Offset = this.ModifyModifySpace(pos, col_no, new_value)
    end_if
else    // add new update triplet to leaf
    this.ShiftLeafEntries(leaf, pos, 1)
    leaf.col_no[pos] = col_no
    leaf.sid[pos] = rid – δ
```

```
    offset = this.AddToModifySpace(pos, col_no, new_value)
    leaf.value[pos] = offset
end_if
```

Algorithm 4
  PDT.AddDelete(rid, SK_values)
Finds the rightmost leaf containing updates on a given rid. Within that leaf, either a new deletion triplet is added at pos, or delete is performed in-place.

```
(leaf, δ) = this.FindLeafByRid(rid)
(pos, δ) = this.SearchLeafForRid(leaf, rid, δ)
while leaf.sid[pos] + δ ≡ rid and leaf.type[pos] ≡ DEL do
    pos = pos + 1
    δ = δ – 1
end_while
if leaf.type[pos + δ ≡ rid then  // In-place update
    if leaf.type[pos] ≡ INS then  // Delete existing insert
        this.ShiftLeafEntries(leaf, pos, –1)
    else  // change existing modify to delete
        leaf.type[pos] = DEL
        offset = this.AddToDeleteSpace(pos, col_no, new_value)
    end_if
else    // add new update triplet to leaf
    this.ShiftLeafEntries(leaf, pos, 1)
    leaf.type[pos] = DEL
    leaf.sid[pos] = rid – δ
    offset = this.AddToDeleteSpace(pos, col_no, new_value)
    leaf.value[pos] = offset
end_if
this.AddNodeDeltas(leaf, –1)
```

For inserts, a key (SID, RID) is required to place the insert in the correct position within the PDT data structure 70'. This key further effectively represents the pre-computation of the tuple position where the insert should be applied against the stable table 56. A pseudo-code implementation of a preferred method for performing an insert update operation against a PDT data structure 70' is provided as Algorithm 5.

Algorithm 5
  PDT.AddInsert(sid, rid, tuple)
Finds the leaf where updates on (sid, rid) should go. Within that leaf, a new insert triplet is added at index pos.

```
(leaf, δ) = this.FindLeafBySidRid(sid, rid)
while leaf.sid[pos] < sid or leaf.sid[pos] + δ < rid do
    if δ ≡ INS then
        δ = δ + 1
    else if δ ≡ DEL then
        δ = δ – 1
    end_if
    pos = pos + 1
end_while
// Insert update triplet in leaf
this.ShiftLeafEntries(leaf, pos, 1)
leaf.type[pos] = INS
leaf.sid[pos] = rid – δ
offset = this.AddToInsertSpace(tuple)
leaf.value[pos] = offset
this.AddNodeDeltas(leaf, 1)
```

An insert tuple position is identified functionally by performance of a query scan that computes the minimum RID for a tuple that has a sort key SK larger than the sort key of the tuple being inserted. The query scan can be implemented using a standard relational MIN aggregate operator. Alternately, depending on the built-in database engine 52 features, the scan can be performed as a specialized binary search, use sparse indexes, and similar techniques to obtain the insert corresponding RIDs.

For each RID obtained, the PDT data structure 70' is searched, using the corresponding sort-key (SK) values, to identify the corresponding SID. A preferred pseudo-code implementation of this PDT data structure 70' search is provided as Algorithm 6. The sort key (SK) values are needed to resolve multiple inserts that may occur against the same SID in the PDT data structure 70'.

Algorithm 6
  PDT.SKRidToSid(tuple[SK], rid)
This routine takes a partial tuple of sort key attribute values together with the RID of the tuple, and returns the SID within the underlying stable image where the tuple should go. This procedure is needed when inserts are propagated from a higher level PDT to this PDT, in order to locate the exact positions of the inserts with respect to deleted stable table tuples.

| Pseudo code: |
| --- |
| (leaf, δ) = this.FindLeafByRid(rid) |
| (pos, δ) = this.SearchLeafForRid(leaf, rid, δ) |
| while leaf.sid[pos] + δ = rid |
|     and leaf.type[pos] = DEL |
|     and tuple[SK] > this.getDelValue(leaf.value[pos]) do |
|     pos = pos + 1 |
|     δ = δ − 1 |
| end_while |
| sid = rid − δ |
| return (sid) |

An aspect of the present invention is the use of the PDT data structure 70' in support of database transactions. In a preferred embodiment of the present invention, strategic copies of the write PDT data structure 72 are used to provide snapshot isolation. That is, each operational transaction, typically corresponding to each new query, is effectively provided with a private isolated snapshot of a stable table 56 through representation by a private copy of a generally top-most PDT data structure 70' layer.

To support efficient private PDT data structure 70' copy creation, the copy size is preferably kept small. The preferred size target is sufficiently small to be maintained in the CPU cache 34 to thereby maximize access performance. In accordance with the present invention, creation of a full copy of the layered PDT data structure 70' can be functionally achieved by copying just the top layer of the write-PDT data structure 72 to create the private snapshot copy, provided the write-PDT data structure 72 is maintained relatively small by operation of the merge processor 74. This top-most write-PDT data structure 72 layer, of the layered PDT data structure 70' is functionally the only portion of the full PDT data structure 70' that would be modified within a single current transaction. By allocating transactions snapshot copies of the write-PDT data structure 72 concurrent with the start of the corresponding transaction, modifications to the PDT data structure 70' and, by extension, the underlying stable table 56, are fully captured and maintained isolated on a per transaction basis. When a transaction commits, the contents of the transaction write-PDT copy are propagated to the write-PDT data structure 72. A preferred pseudo-code implementation of a Write-PDT propagation operation is provided as Algorithm 7.

Algorithm 7
  PDT.Propagate(W)
Propagates the updates present in argument PDT W to this PDT R, subject to the condition that W is consecutive to R.

| Pseudo code: |
| --- |
| leaf = W.FindLeafBySid(0) |
| pos = δ = 0 |
| while leaf do      // Iterate over input updates |
|     rid = leaf.sid[pos] + δ |
|     if leaf.type[pos] = INS then // Insert |
|         sid = SKRidToSid(leaf.values[pos][SK], rid |
|         R.AddInsert(sid, rid, leaf.value[pos]) |
|         δ = δ + 1 |
|     else if leaf.type[pos] = DEL then   // Delete |
|         R.AddDelete(rid, leaf.value[pos][SK]) |
|         δ = δ − 1 |
|     else // Modify |
|         R.AddModify(rid, col_no, leaf.value[pos][col_no]) |
|     end_if |
|     (pos, leaf) = W.NextLeafEntry(pos, leaf) |
| end_while |

Thus, given a PDT data structure 70' R holding all updates in the range from $[t_0, t_1)$, the propagation operation functions to apply all updates of a consecutive PDT data structure 70' W containing updates in the time range $[t_1, t_2)$:

$$R_{t_2}^{t_0} \leftarrow R_{t_1}^{t_0} \cdot \text{Propagate}(W_{t_2}^{t_1})$$

A stable table 56 is thus the product:

$$\text{TABLE}_0 \cdot \text{Merge}(R_{t_2}^{t_0}) = \text{TABLE}_0 \cdot \text{Merge}(R_{t_1}^{t_0}) \cdot \text{Merge}(W_{t_2}^{t_1})$$

This propagation operation is executed to migrate the contents to a lower-layer of the PDT data structure 70'. Architecturally, a write-PDT data structure 72 is preferably maintained sufficiently small to remain in the CPU cache 34, while the read-PDT data structure 70 is maintained in main memory 36. The propagate operator transfers all updates in a higher-layer PDT data structure 70' R in left-to-right leaf order and applies them to the immediately underlying W PDT data structure 70'. Observing that the SIDs of one PDT layer are the RIDs of the layer immediately below, the propagation operator converts RIDs to SIDs in performing the transfer.

Creation of new transaction write-PDT data structure 72 copies can be strategically deferred. A newly started transaction can share a write-PDT data structure 72 copy with an existing, open transaction provided the prior transaction has not committed any changes made to the write-PDT data structure 72. When any other transaction commits, that transaction will update the underlying write-PDT data structure 72 without affecting the open concurrent read transactions. The concurrent read-queries will continue to access their private, potentially shared write-PDT data structure 72 copy and, consequently, will remain isolated from committing updates.

Figure 11:
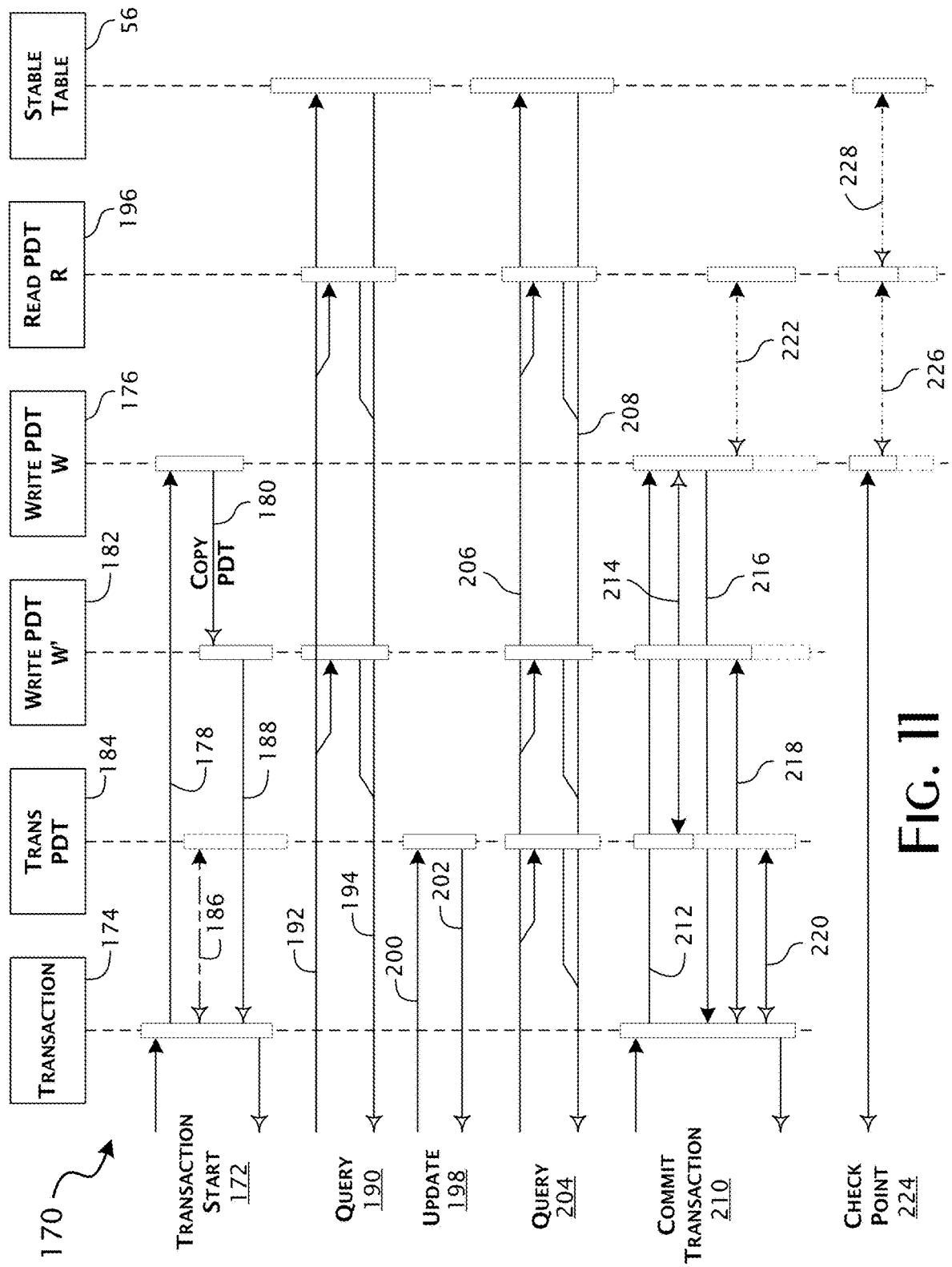
FIG. 11 is a structure diagram illustrating the operational implementation of read and update operations utilizing a positional delta tree structure in accordance with preferred embodiment of the present invention.

As generally shown in FIG. 11, the preferred embodiments of the present invention support multi-query transactions, where subsequent queries occurring within a single transaction properly reflect the results of previous updates that occurred within the scope of the otherwise uncommitted transaction. Thus, functionally in response to a start transaction request 172, a transaction 174 is established. Within the scope of the transaction 174 start, the underlying write-PDT data structure W 176 is accessed 178 and copied 180 to create a write-PDT data structure copy W' 182.

Multi-query operation is preferably implemented through use of an additional, transactional PDT data structure 70', referred to as a trans-PDT data structure. A trans-PDT data structure instance is preferably private to a single transaction and initially empty. Subsequent insert, modification and delete operations within the current transaction 174 will complete against the single trans-PDT data structure instance. As shown, a trans-PDT data structure 184, created 186 as an initially empty PDT data structure 70', allocated for a specific transaction 172. The trans-PDT data structure 184 may be created as part of the transaction start operation 172 or, as implemented in the presently preferred embodiments, actually created only in connection with the first update operation that occurs within the transaction 174. The transaction start operation 172 is complete 188 once the write-PDT data structure copy W' 182 has been established.

As generally shown, a following read data access operation 190 will functionally bypass the empty Trans-PDT 184. The query read operation 192 completes by a merger 194 of differential update data from the write-PDT data structure copy 182 and read-PDT data structure 196 with data tuples retrieved by a query scan of the underlying stable table 56.

An update operation 198 will execute to completion 200 directly against the trans-PDT data structure 184. This and any other differential update data provided to the trans-PDT data structure 184 in subsequent update operations occurring during the current transaction 174 will continue to accumulate in the trans-PDT data structure 184.

Query read operations 204 occurring subsequent to any update operation 198 will involve the trans-PDT data structure 184. The query operation 204 will access 206 and complete by a merger 208 of differential update data from the trans-PDT data structure 184, the write-PDT data structure copy 182 and the read-PDT data structure 196 with data tuples retrieved by a query scan the underlying stable table 56. Thus, the effective table image TABLE$_t$ seen by any query or update data access operation 184 at a time t, considering the trans-PDT data structure 184, the write-PDT data structure copy 182 and the read-PDT data structure 196, is defined as:

$$\text{TABLE}_t = \text{TABLE}_0 \cdot \text{Merge}(R_r^0) \cdot \text{Merge}(W_W^r) \cdot \text{Merge}(T_t^W) \quad \text{Eq. 13}$$

In alternate embodiments of the present invention, an additional, higher level PDT data structure 70' layer, or query-PDT data structure (not shown), may be employed. A query-PDT data structure is particularly useful to provide an additional layer of isolation for update operations involving sub-selects. Similar to a trans-PDT data structure, the query-PDT data structure is initially created empty. As the sub-selects complete, the differential update data is collected into the query-PDT data structure. Should the update operation fail for any reason, the query-PDT data structure is discarded. On successful completion, the differential update data accumulated into the query-PDT data structure is propagated, preferably utilizing the write-PDT propagation operation implemented by Algorithm 7, to the current trans-PDT data structure 184. The query-PDT data structure is then released.

On commit 210 of an open transaction 174, the differential updates accumulated into any existent trans-PDT data structure 184 are nominally transferred 212, 214 to the underlying write-PDT data structure 176. The write-PDT propagation operation implemented by Algorithm 7 may be used to perform this transfer. Relative to subsequent, non-overlapping transactions, the combination of the write-PDT data structure 176, the read-PDT data structure 196, and stable table 56 represents a current, operative image of the database table.

The write-PDT propagation operation implemented by Algorithm 7 may not be used where a concurrent transaction has committed updates against a shared instance of the write-PDT data structure copy 182. In this circumstance, the time range encompassed by updates captured in the underlying write-PDT data structure 176 can potentially overlap with the time range of updates in the trans-PDT data structure 184 of the later committing transaction. As generally indicated, the time range of the underlying write-PDT data structure 176 is initially checked 212. Where an overlap exists, the subsequent, conflicting transaction is nominally aborted. As discussed below, no actual conflict occurs if, upon analysis, the later committing updates do not intersect with the prior committing updates. A later committing update that intersects with a prior committing update occurs where both would modify at least one tuple or tuple attribute in common. Where no overlap actually occurs, the write-PDT propagation operation implemented by Algorithm 7 may then be used to copy 214 the differential updates from the trans-PDT data structure 184 to the write-PDT data structure 176. On completion 216 of the copy 214, the write-PDT data structure copy 182 may be released 218. The trans-PDT data structure 184 is then also released 220.

Generally following from the transfer of differential update data to the write-PDT data structure 176, a merge operation 222 may be invoked. When invoked, the write-PDT propagation operation implemented by Algorithm 7 is preferably utilized to transfer differential update data from the write-PDT data structure 176 to the read-PDT data structure 196. The transferred differential update data is removed from the write-PDT data structure 176.

A checkpoint operation 224 will invoke a merge operation 226, as needed, to move any differential update data present in the write-PDT data structure 176 to the read-PDT data structure 196. The resulting cumulative differential update data is then persisted to the stable table 56.

Figure 12:
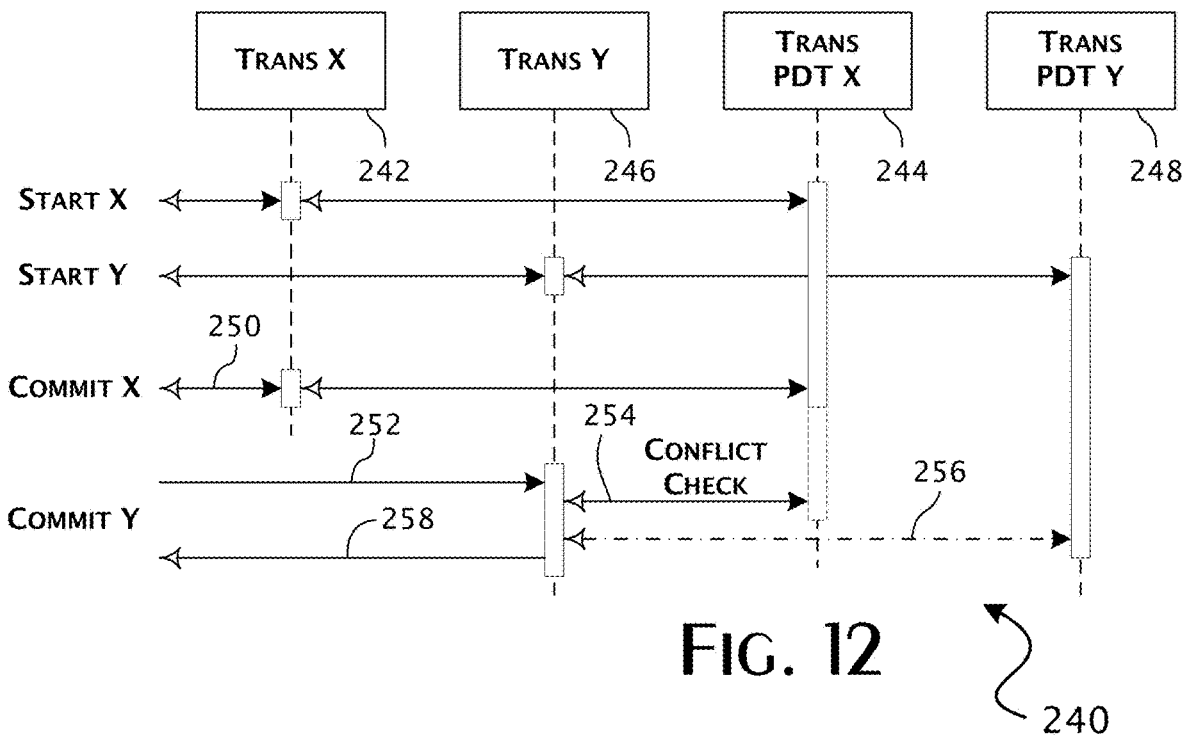
FIG. 12 is a structure diagram illustrating the operational implementation of transactional resolution in the handling of a positional delta tree structure in the presence of an overlapping transaction in accordance with a preferred embodiment of the present invention.

As generally shown in FIG. 12, the execution 240 of overlapping transactions is preferably supported by allocation of separate trans-PDT data structures. For purposes of discussion, a transaction X 242 starts at time $t_0$ and is not initially concurrent with any other transaction. An empty trans-PDT data structure 244 Tx$^{t0}$ is created along with a snapshot copy Wx$^{t0}$ (not shown) of the underlying shared write-PDT data structure copy W$^{t0}$. A concurrent transaction Y 246 starts at $t_1$, resulting in the similar creation of an empty trans-PDT data structure 248 Ty$^{t1}$ along with a snapshot write-PDT data structure copy Wy$^{t1}$ (not shown) of the underlying shared Write-PDT W$^{t0}$. Until transaction X 242 commits 250 at a time $t_2$, update operations within the transaction X 242 are captured into the Trans-PDT 244. Given that transaction Y 246 has not committed 252, the write-PDT propagation operation implemented by Algorithm 7 is used to propagate the contents of the trans-PDT data structure 244 to the underlying shared write-PDT data structure W$^{t0}$, creating a write-PDT data structure W$^{t2}$ that reflects the committed updates of transaction X 242.

On commit 252 of transaction Y 246, and in the general case on commit of all potentially concurrent transactions, a conflict check 254 is preferably performed to determine whether the trans-PDT data structure 248 overlaps the updates now committed to the underlying shared write-PDT data structure W$^{t2}$. For implementation of the snapshot isolation in accordance with a preferred embodiment of the present invention, a conflict is defined as occurring where the time ranges of the update operations of the set of concurrent transactions overlap and the updates in some manner modify the same tuple. If an actual conflict does not exist, the updates captured in trans-PDT data structure 248 can be propagated to the underlying shared write-PDT data structure $W^{t2}$, creating a write-PDT data structure $W^{t3}$ that reflects the combined updates of transaction X 242 and transaction Y 246.

To detect the existence of an actual conflict between the updates made by the concurrent transactions X 242, Y 246, the updates are preferably first aligned so as to be relative to the same database snapshot, defined as matching SID domains. Once aligned, the updates are checked for actual conflicts relative to the aligned database snapshot. Since no intervening commit occurred between the snapshots $Wx^{t0}$ and $Wy^{t1}$, the two snapshots are aligned. Conflict between the updates captured in the transactions X and Y 242, 246 is analyzed by performing an ordered comparison between the update SIDs in the trans-PDT data structures 244, 248. The transactions X Y 242, 246 are thus serialized by transforming the updates made within transaction Y 246 from $Ty_{t_1}^{t_1}$ $Ty_{t_3}^{t_2}$, thereby permitting commit 256 of transaction Y 246 consistent with the prior committed transaction X 242, thereby creating the write-PDT data structure Wt3.

A preferred pseudo-code implementation of a PDT serialization operation is provided as Algorithm 8.

Algorithm 8

PDT.Serialize(Tx)

Invoked on a PDT Ty with an aligned PDT Tx as input. Functions to check the updates in Ty, representing the relatively newer PDT, for conflicts with an earlier committed transaction Tx. FALSE is returned if a conflict is determined. Operates on Ty (referred to as T'y) to convert the SID domain of Ty to the RID domain of Tx.

Pseudo code:

```
imax= Ty.count( )
jmax= Tx.count( )
i = j = δ = 0
while i < imax do  // Iterate over new updates
    while j < jmax and Tx[j].sid < Ty[i].sid do
        if Tx[j].type = INS then
            δ = δ + 1
        else if Tx[j].type = DEL then
            δ = δ - 1
        end_if
        j = j + 1
    end_while
    if Tx[j].sid = Ty[i].sid then   // potential conflict
        if Tx[j].type = INS and Ty[i].type = INS then
            if Tx[j].value < Ty[i].value then
                δ = δ + 1
                j = j + 1
            else if Tx[j].value = Ty[i].value then
                return false
            else
                Ty[i].sid = Ty[i].sid + δ
                i = i + 1
            end_if
        else if Tx[j].type = DEL then
            if Ty[i].type ≠ INS then
                return false
            else  // Never conflict with Insert
                Ty[i].sid = Ty[i].sid + δ
                δ = δ + 1
                i = i + 1
            end_if
        else  // Modify in Tx
            if Ty[i].type = DEL then
                return false
            else if Ty[i].type ≠ INS then
                CheckModConflict( )
```

Pseudo code:

```
        else  // Insert in Ty goes before Modify in Tx
            Ty[i].sid = Ty[i].sid + δ
            i = i + 1
        end_if
    end_if
    else  // Current SID in Tx is bigger than in Ty
        Ty[i].sid = Ty[i].sid + δ   // Only convert SID
        i = i + 1
    end_if
end_while
return true
```

The PDT serialization operation implemented as Algorithm 8 returns false if conflicting updates are determined to exist. As implemented in the preferred embodiments, the conflict checking is performed to a tuple attribute-level. Modifications to different attributes of the same tuple by the different concurrent transactions are not treated as actual conflicts. The CheckModConflict method (not listed) preferably implements a per attribute modification check; this check will fail if an update from both transactions modify the same attribute in the same tuple. Where an actual conflict is detected, the preferred consequence is that the later transaction is aborted.

Support for concurrent transactions can be extended to any arbitrary number of transactions through appropriate transaction commit management. A preferred pseudo-code implementation of a finish transaction operator is provided as Algorithm 9. In the general case, for each recently committed transaction zi that overlaps with a currently committing transaction x, the serialized trans-PDT data structure $T^0 zi$ of the transaction zi is kept in a data set TZ. A reference counter is preferably implemented to determine when the trans-PDT data structure of any prior transaction no longer participates in a concurrent transaction. When all transactions that are effectively concurrent with the serialized trans-PDT data structure $T^0 zi$, that serialized trans-PDT data structure $T^0 zi$ is removed from the set TZ.

Each trans-PDT data structure $T^0 zi$ is consecutive with and holds the interval changes that the transaction zi applied to the prior database state. The creation of such a trans-PDT data structure $T^0 zi$ is in fact a by-product of the fact that zi committed. As described relative to the two-transaction case, committing entails using the serialize operator to transform the trans-PDT data structure Tx of the committing transaction possibly multiple times; once for each overlapping transaction zi in the data set TZ in commit order. The execution of the serialize operator serves both to check for a conflict in the application of the update from the transaction x, potentially leading to an abort of the transaction x, as well as to produce the serialized trans-PDT data structure $T^0 x$ that is consecutive to the database state at the commit time of transaction x. Where no actual conflict is detected, the serialized trans-PDT data structure $T^0 x$ added to the data set TZ and propagated to the underlying Write-PDT.

Algorithm 9

Finish(ok, $Wt_n$, Txt, TZ)

Commit(w, tx, tz)=Finish(true, w, tx, tz)

Abort(w, tx, tz)=Finish(false, w, tx, tz)

Handles a transaction x that started at t, that tries to commit the corresponding Trans-PDT Tx$^t$ into the underlying shared Write-PDT $Wt_n$, taking into account the sequence of relevant previously committed consecutive PDTs TZ=(T'z{t0, t1}, ..., T'zn{tn−1, tn}). If there are conflicts between Tx and T'zi ∈ TZ, the operation fails and the transaction x will be aborted. Otherwise, the final T'x is added to TZ and is propagated to $Wt_n$.

```
Pseudo code:

T'x= Tx
i = 0
while (i = i + 1) ≤ n do        // iterate over all T'i
    T = T'z{ti-1, ti}
    if t < t_i then    // overlapping transactions
        if ok then
            ok =Serialize(T'x, T)
        end_if
        T.refcnt= T.refcnt - 1
        if T.refcnt = 0 then     // x is last overlap with zi
            TZ = TZ - T
        end_if
    end_if
end_while
if ok = false then        // conflict: x must abort
    return false
end_if
W{tn+1} = W{tn}.Propagate(T'x)
T'x.refcnt = ||running_transactions||
if T'x.refcnt > 0 then
    TZ = TZ + T'x
end_if
return true      // x can commit
```

Figure 13:
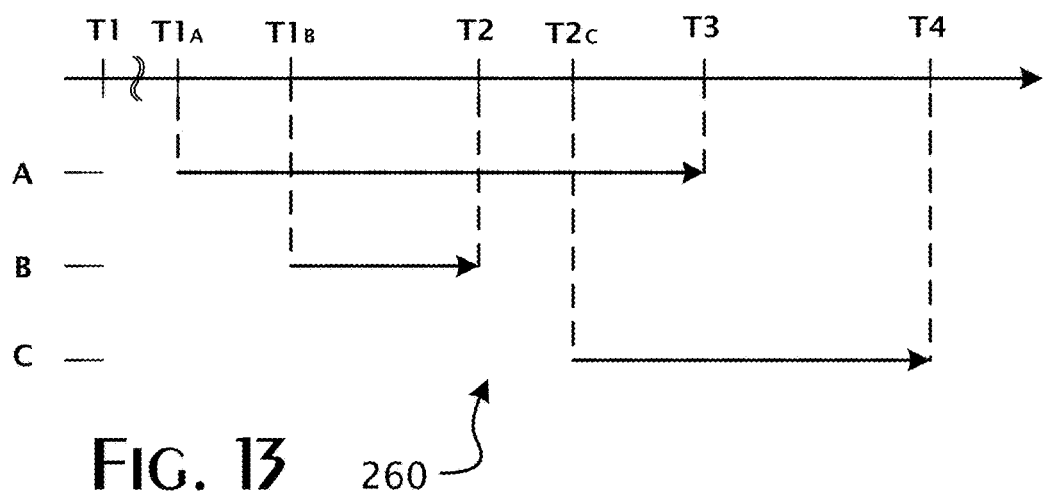
FIG. 13 illustrates the time dependent handling of positional delta tree structures in the presence of overlapping transactions in accordance with a preferred embodiment of the present invention.

Handling of multiple concurrent transactions, a, b, c, is further shown in FIG. 13. At a start time T1, the initial underlying write-PDT data structure is defined as $Wt_1 = \emptyset$. At T1a, a first transaction, a, starts and receives a snapshot write-PDT data structure: $Wa = Copy(Wt_1) = \emptyset$. The notation T1a is used to identify the database state at a time that is the same as at T1. Transaction a starts out with an empty trans-PDT data structure, $Ta^{T1a} = \emptyset$. At $T_{1b}$, a second transaction, b, starts and receives the same snapshot $Wb = Wa$, given no intervening commit. At T2, transaction b commits, thereby propagating the transaction b updates from $Tb_{t_2}^{t1b}$ to the current stable table image. Given that no commits occurred during the lifetime of transaction b, current table image is still represented by Wb. The trans-PDT data structure updates can therefore be propagated to the underlying write-PDT data structure:

$$Wt_2 = Wt_1 \cdot Propagate(Tb_{t_2}^{t1b})$$ Eq. 14

The resulting updated underlying write-PDT data structure thus reflects the current table state that will be seen by the new transaction c at T2c. The snapshot write-PDT data structure received is $Wct_{2c} = Copy(Wt_2)$ and an empty trans-PDT data structure $Tc^{T2c} = \emptyset$ is created. The transaction a then commits at T3. $Ta_{t_3}^{t1a}$ is serialized with resp, $Tb_{t_2}^{t1a}$ as:

$$T'a_{t_3}^{t2} = Serialize(Ta_{t_3}^{t1a}, Tb_{t_2}^{t1b})$$

For purposes of example, the serialization of $T'a_{t_3}^{t1c}$ reports no actual conflicts. The resulting $T'a_{t_3}^{t2}$ is consecutive to $Wt_2$, permitting committing of transaction c to realize $Wt_3$. Finally, when the transaction c finally commits at T4, the serialized write-PDT data structure $T'a_{t_3}^{t2}$, aligned to $T^{Tc2}$ is present in the data set TZ. The conflict check at T4 determines:

$$T'c_{t_4}^{t3} = Serialize(Tc_{t_4}^{t2c}, T'a_{t_3}^{t2})$$

Provided no actual conflict is found, the updates from the transaction $T^{Tc2}$ are propagated to the underlying write-PDT data structure $Wt_4$.

Thus, a positional delta tree update system architecture, including positional update management, query merger, transactional management support providing optimistic concurrency control, has been described. While the present invention has been described particularly with reference to its presently preferred embodiments, primarily dedicated database server systems, the present invention is equally applicable to combined application and database systems, distributed computing systems, including distributed storage systems, and embedded systems.

In view of the above description of the preferred embodiments of the present invention, many modifications and variations of the disclosed embodiments will be readily appreciated by those of skill in the art. In particular, while the present invention has been described in connection with and as applied to column store databases, the present invention may also be applied to row store databases. It is therefore to be understood that, within the scope of the appended claims, the invention may be practiced otherwise than as specifically described above.

The invention claimed is:

1. A computer system comprising:
    a column-store organized database store providing for the storage of a database table; and
    a central processor subsystem, including a cache memory and main memory, coupled to said database store, said central processor subsystem being operative to execute as a database engine system responsive to database requests received relative to said database table, including query requests to return data tuples and update requests to store data tuples, said database engine system including:
    a write-store structure, established within the main memory accessible by said central processor subsystem, providing for the storage of differential update data in a write positional delta tree structure, wherein said differential update data is stored with positional data relating said differential update data with positions defined with respect to a stable state of said database table;
    a read-store structure, wherein said write-store structure provides for the storage of first differential update data and said read-store structure provides for the storage of second differential update data, said second differential update data being stored in a read positional delta tree structure, wherein said second differential update data is stored with pre-computed positional data relating said second differential update data with positions defined with respect to said stable state of said database table;
    a merge scan processor, coupled to said write-store structure, operative to dynamically merge said differential update data with read data tuples retrieved from said database table if the differential update data does not modify the same tuple already committed to said positional delta tree and to optimize the dynamic merger of read data tuples with said differential update data for read-mostly operation of the database engine system, wherein said merge scan processor is coupled to said read-store structure, said merge scan processor being operative to dynamically merge said first and second differential update data with read data tuples retrieved from said database table, wherein said pre-computed positional data identifies the merge position of said first and second differential update data with respect said stable state positions of said read data tuples;
    an update processor operative in response to update requests providing update data tuples to store said first differential update data in said write-store structure, said write positional delta tree structure representing differential updates in leaf nodes related through mapping nodes storing delta values with respect directly connected child nodes, wherein each said delta value represents a net change in effective tuple position relative to said stable state positions for said first differential update data stored in corresponding child node subtrees, and wherein leaf nodes store references to entries in update type defined differential value tables, wherein said update processor is responsive to transaction start and commit requests, wherein a transaction-store is provided with respect to a transaction start request, wherein said transaction-store provides for the storage of transaction differential update data in a transaction positional delta tree structure, wherein said transaction differential update data is stored with pre-computed positional data relating said transaction differential update data with positions defined with respect to said stable state of said database table, wherein said update processor is further operative to provide an isolation-store as an instance copy of said write-store structure relative to said transaction start request, wherein query requests are resolved within the scope of a database transaction by dynamic merge access by said merge scan processor to said isolation-store in preference to said write-store structure;

a merge processor operative to transfer said first differential update data from said write-store structure to said read-store structure and a checkpoint processor operative with said merge scan processor, to transfer and merge said second differential update data with data tuples stored in said database table, adjusting said stable state positions of said read data tuples, wherein said merge scan processor is further coupled to said transaction store and operative to dynamically merge said transaction, first, and second differential update data with read data tuples retrieved from said database table, wherein said pre-computed positional data identifies the merge position of said transaction, first and second differential update data with respect said stable state positions of said read data tuples; and wherein update data tuples provided with respect to update requests are stored as transaction differential update data in said transaction-store pending receipt of a transaction commit request corresponding to said transaction start request, said update processor being further operative to transfer said transaction differential update data from said transaction-store to said write-store structure in response to said transaction commit request;

wherein said positional data identifies the merge position of said differential update data with respect said stable state positions of said read data tuples, whereby the merger of said differential update data and read data tuples provides current data tuples responsive to a predetermined database request; and wherein said update processor, in response to said commit request, is operative to conditionally transfer said transaction differential update data to said write store dependent on the absence of an actual conflict between said transaction differential update data and said write differential update data, said update processor being operative to first align said transaction and write differential update data into a common domain with respect to said stable state positions existing in said database table and second detect attribute update overlaps a same domain tuple position, wherein an overlapping update represents said actual conflict.

2. The computer system of claim 1 wherein said database table, as stored in said database store, is organized as a column-store.

3. The computer system of claim 2 wherein said merge scan processor is operative to optimize the dynamic merger of read data tuples with said differential update data for read-mostly operation of said database engine.

* * * * *